United States Patent
Gholmieh et al.

(10) Patent No.: US 9,877,254 B2
(45) Date of Patent: Jan. 23, 2018

(54) METHODS AND APPARATUS FOR UPDATING THE UE CAPABILITY IN AN E-UTRAN

(75) Inventors: Aziz Gholmieh, San Diego, CA (US); Lorenzo Casaccia, Rome (IT); Xipeng Zhu, Beijing (CN); Masato Kitazoe, Tokyo (JP); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 592 days.

(21) Appl. No.: 13/823,706

(22) PCT Filed: Nov. 4, 2011

(86) PCT No.: PCT/CN2011/081791
§ 371 (c)(1),
(2), (4) Date: Mar. 14, 2013

(87) PCT Pub. No.: WO2013/063793
PCT Pub. Date: May 10, 2013

(65) Prior Publication Data
US 2013/0322302 A1 Dec. 5, 2013

(51) Int. Cl.
*H04W 36/24* (2009.01)
*H04W 76/06* (2009.01)
*H04W 36/00* (2009.01)

(52) U.S. Cl.
CPC ....... *H04W 36/24* (2013.01); *H04W 36/0055* (2013.01); *H04W 76/06* (2013.01)

(58) Field of Classification Search
CPC .................... H04W 36/0055; H04W 76/06
See application file for complete search history.

(56) References Cited

U.S. PATENT DOCUMENTS

2007/0287460 A1 12/2007 Koo et al.
2010/0040018 A1 2/2010 Appani et al.
2011/0021199 A1* 1/2011 Hapsari .................. H04W 4/20
455/440

(Continued)

FOREIGN PATENT DOCUMENTS

JP 2010536292 A 11/2010
WO 2008020280 2/2008

(Continued)

OTHER PUBLICATIONS

Written Opinion and International Search Report dated Jul. 19, 2012 from related International Application No. PCT/CN2011/081791.

(Continued)

*Primary Examiner* — David Oveissi

(57) ABSTRACT

A method, an apparatus, and a computer program product for wireless communication are provided. The apparatus transmits a first set of capabilities to a first cell. The first set of capabilities is for communication with the first cell. The apparatus transmits information associated with a second set of capabilities to the first cell. The second set of capabilities is for communication with a second cell. The apparatus moves from the first cell to the second cell. The apparatus communicates with the second cell based on the transmitted information.

42 Claims, 31 Drawing Sheets

(56) References Cited

U.S. PATENT DOCUMENTS

| | | | |
|---|---|---|---|
| 2011/0039562 A1* | 2/2011 | Balasubramanian | H04W 36/0033 455/436 |
| 2012/0014357 A1* | 1/2012 | Jung | H04L 5/0035 370/332 |
| 2013/0039232 A1* | 2/2013 | Kim | H04L 5/14 370/280 |
| 2014/0242985 A1* | 8/2014 | Kneckt | H04W 48/16 455/434 |

FOREIGN PATENT DOCUMENTS

| | | |
|---|---|---|
| WO | 2009152099 | 12/2009 |
| WO | 2011122045 A1 | 10/2011 |

OTHER PUBLICATIONS

Qualcomm Incorporated: "Capability reporting for dual mode UEs (FDD/TDD)", 3GPP Draft; R2-115376_FDD_TDD_CAPABILITIES, 3rd Gene Ration Partnership Project (3GPP), Mobile Competence Centre; 650, Route Des Lucioles; F-06921 Sophia-Antipolis Cedex; France, vol. RAN WG2, No. Zhuhai; Oct. 10, 2011, Oct. 4, 2011 (Oct. 4, 2011), XP050541048, [retrieved on Oct. 4, 2011] the whole document.

Qualcomm Incorporated: "UE capability for FDD and TDD", 3GPP Draft; R2-111868, 3rd Generation Partnership Project (3GPP), Mobile Competence Centre; 650, Route Des Lucioles; F-06921 Sophia-Antipolis Cedex; France, vol. RAN WG2, No. Shanghai, China; Apr. 11, 2011, Apr. 4, 2011 (Apr. 4, 2011), XP050494313, [retrieved on Apr. 4, 2011] the whole document.

Renesas Mobile Europe LTD: "FGI bit handling for TDD/FDD dual mode UEs", 3GPP Draft; R2_115117 TDD_FDD_FGI_BIT_DISCUSSION, 3rd Generation Partnership Projet (3GPP), Mobile Competence Centre; 650, Route Des Lucioles; F-06921 Sophia-Antipolis Cedex; France, vol. RAN WG2, No. Zhuhai; Oct. 10, 2011, Oct. 3, 2011 (Oct. 3, 2011), XP050540756, [retrieved on Oct. 3, 2011] the whole document.

Samsung: "Discussion on FGI bit handling for FDD/TDD dual mode UE", 3GPP Draft; R2-114177 FDD_TDD FGI, 3rd Generation Partnership Project (3GPP), Mobile Competence Centre ; 650, Route Des Lucioles; F-06921 Sophia-Anti Polis Cedex; France, vol. RAN WG2, No. Athens, Greece; Aug. 22, 2011, Aug. 16, 2011 (Aug. 16, 2011), XP050539988, [retrieved on Aug. 16, 2011] the whole document.

Translation of Office Action issued for Japanese Application No. 2014-539206 dated May 26, 2015, 5 pages.

* cited by examiner

METHODS AND APPARATUS FOR UPDATING THE UE CAPABILITY IN AN E-UTRAN

BACKGROUND

Field

The present disclosure relates generally to communication systems, and more particularly, to updating user equipment (UE) capability in an evolved UMTS Terrestrial Radio Access Network (E-UTRAN).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided. The apparatus moves from a first cell to a second cell. The UE has a first set of capabilities for communication with the first cell and a second set of capabilities for communication with the second cell. The apparatus determines whether the first set of capabilities and the second set of capabilities are different and whether the first cell or the second cell queried for the second set of capabilities. The apparatus re-attaches to a network entity associated with the second cell in order to cause the second cell to query for the second set of capabilities upon determining that the first set of capabilities and the second set of capabilities are different, and that the first cell and the second cell did not query for the second set of capabilities.

In an aspect of the disclosure, a method, a computer program product, and an apparatus (UE) are provided. The apparatus transmits a first set of capabilities to a first cell. The first set of capabilities is for communication with the first cell. The apparatus transmits information associated with a second set of capabilities to the first cell. The second set of capabilities is for communication with a second cell. The apparatus moves from the first cell to the second cell. The apparatus communicates with the second cell based on the transmitted information.

In an aspect of the disclosure, a method, a computer program product, and an apparatus (source cell) are provided. The source cell determines a UE is subject to handover from the source cell to a target cell. The source cell transmits an inquiry to the UE for a set of capabilities used by the UE for communicating with the target cell. The source cell receives the set of capabilities from the UE. The source cell provides the set of capabilities to the target cell.

In an aspect of the disclosure, a method, a computer program product, and an apparatus (target cell) are provided. The target cell receives a handover request from a network entity for a handover of a UE from a source cell to the target cell. The handover request includes a first set of capabilities associated with the source cell. The target cell determines a set of capabilities for constructing a handover request acknowledgement when the first set of capabilities is different than a second set of capabilities associated with the target cell. The set of capabilities is a subset of the second set of capabilities. The target cell constructs the handover request acknowledgement based on the set of capabilities. The target cell transmits the handover request acknowledgement to the network entity.

In an aspect of the disclosure, a method, a computer program product, and an apparatus (UE) are provided. The UE transmits a tracking area update (TAU) request to a network entity while in a connected state with a cell. The TAU request indicates that the capabilities for the communication with the cell should be updated. The UE receives a TAU accept message from the network entity. The UE moves to an idle state upon receiving an RRC connection release message from a base station associated with the network entity.

In an aspect of the disclosure, a method, a computer program product, and an apparatus (network entity) are provided. The network entity receives a TAU request from a UE while the UE is in a connected state with a cell. The TAU request indicates that the capabilities for the communication with the cell should be updated. The network entity transmits a TAU accept message to the UE. The network entity transmits, upon transmitting the TAU accept message and in response to the TAU request, one of a UE context release message to a base station controlling the cell in order to release the connection for the UE, or a message to the base station controlling the cell indicating that the capabilities should be updated.

DETAILED DESCRIPTION

Figure 1:
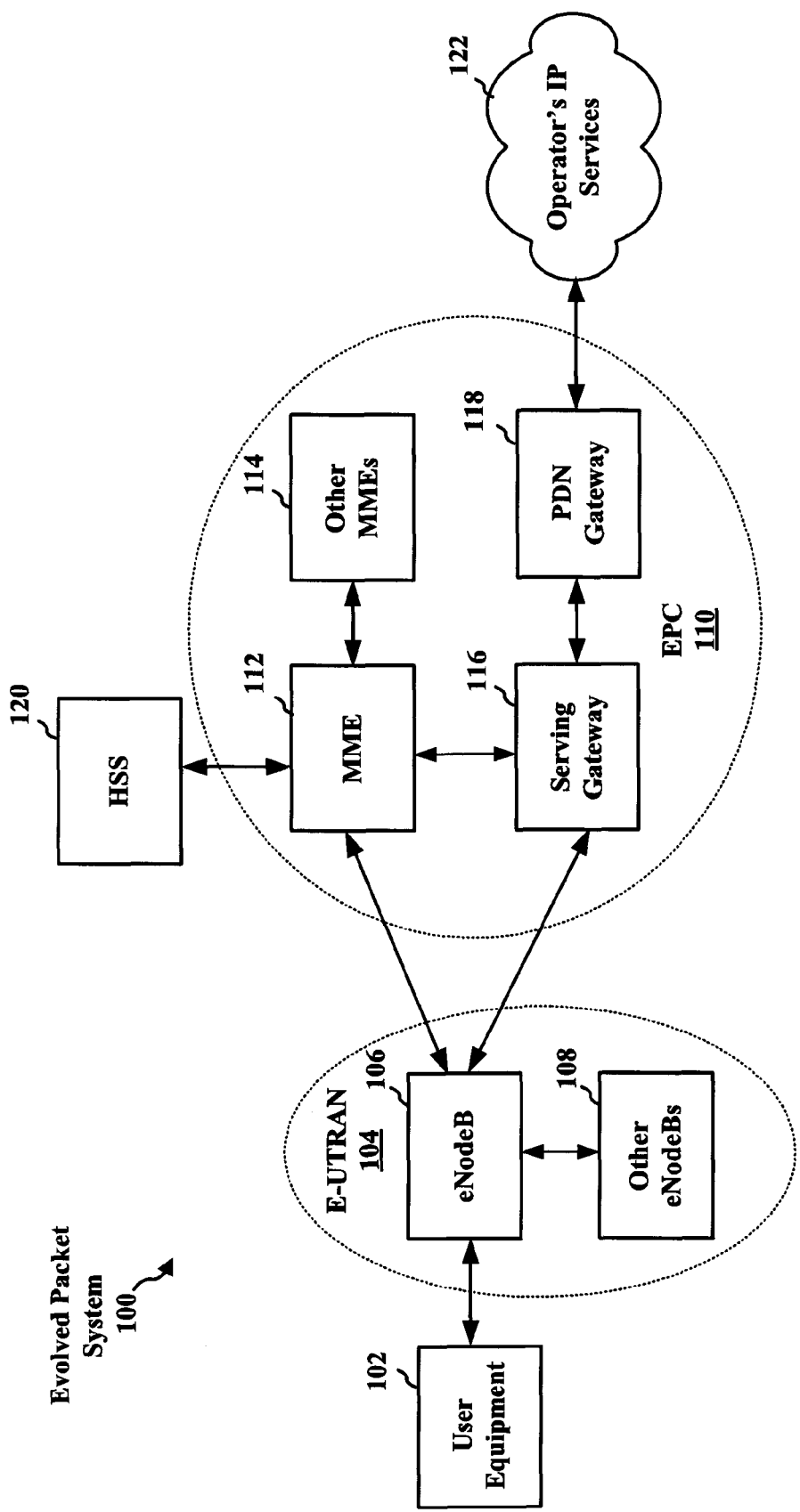
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an E-UTRAN 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
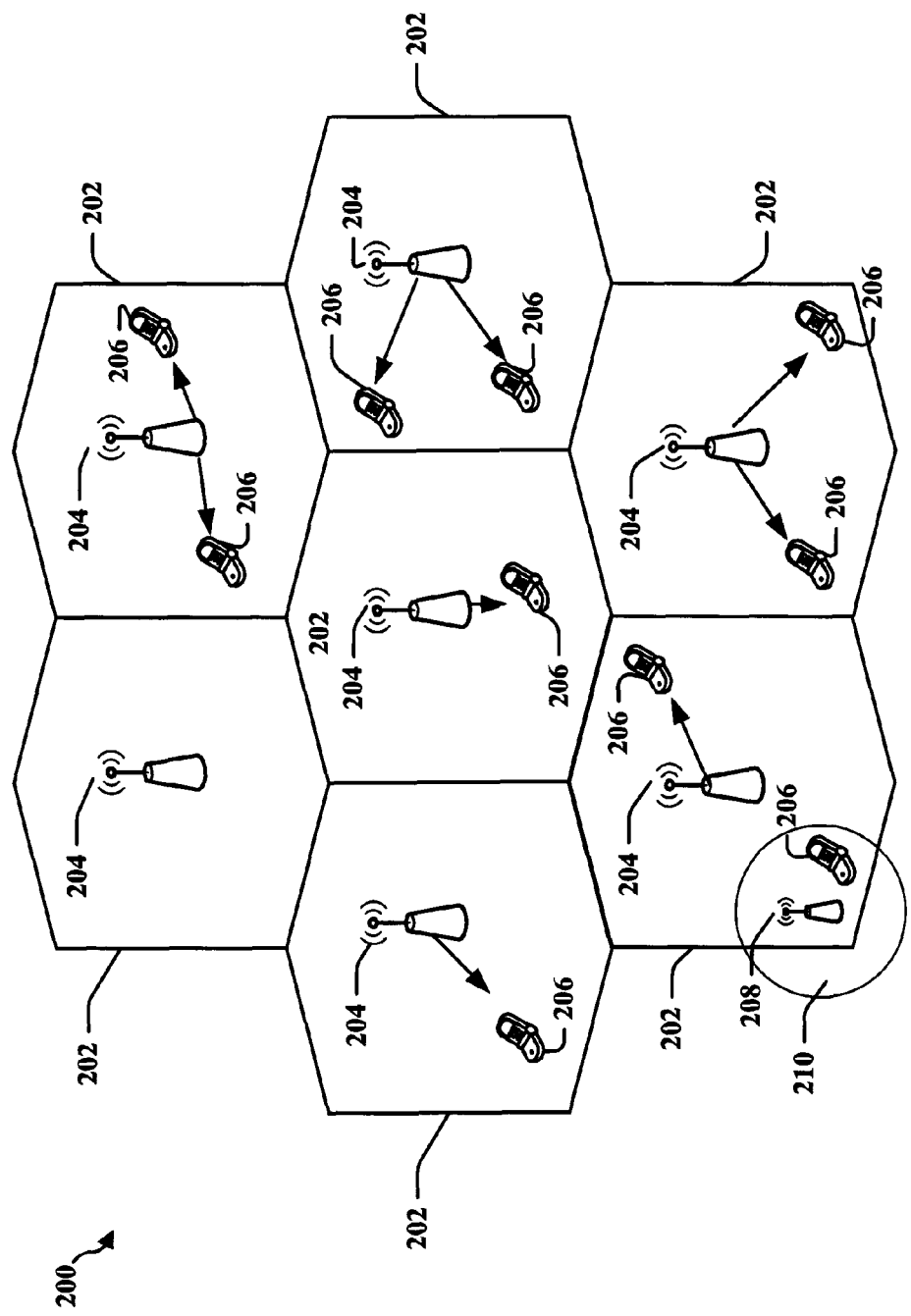
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
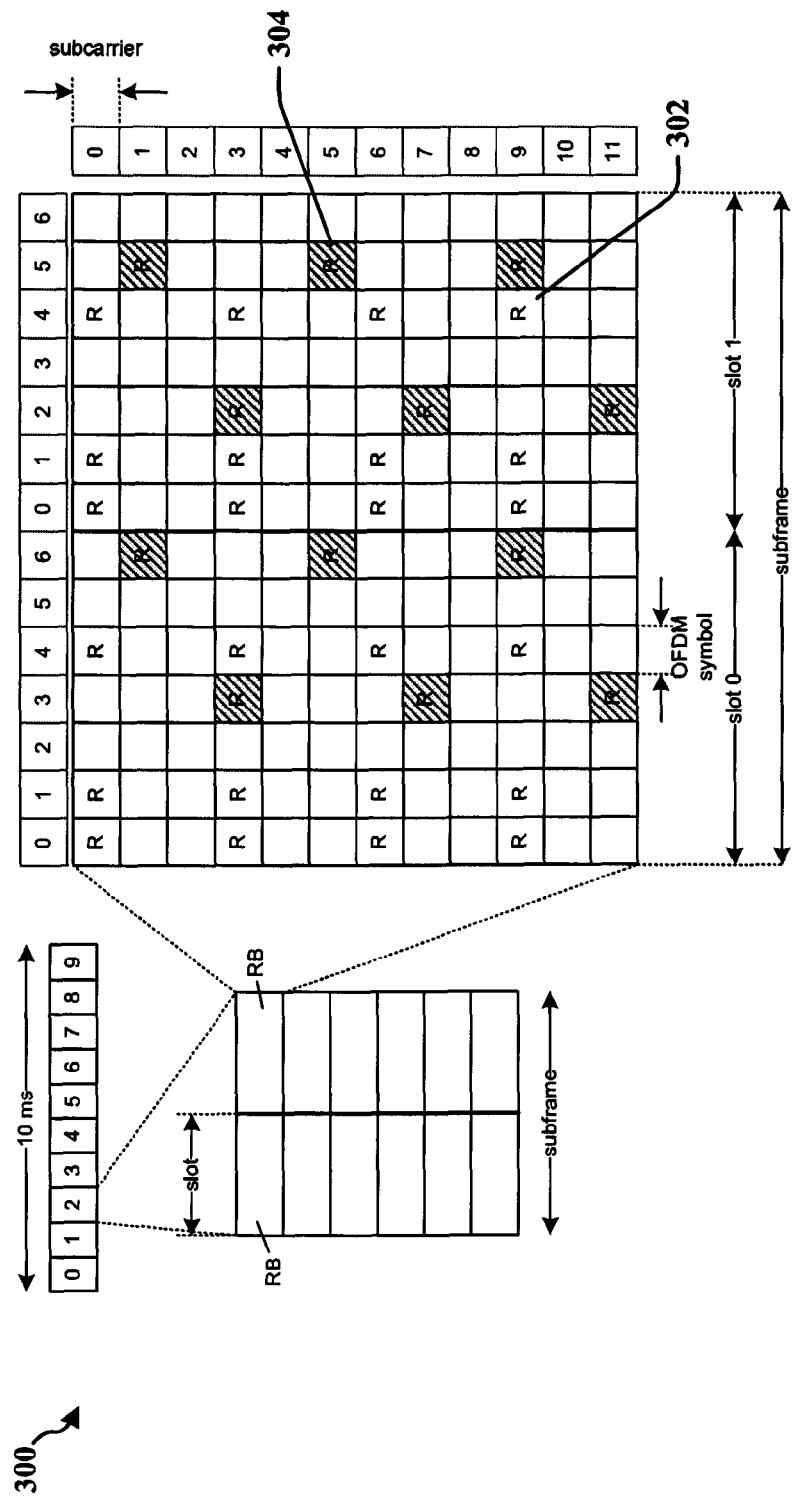
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
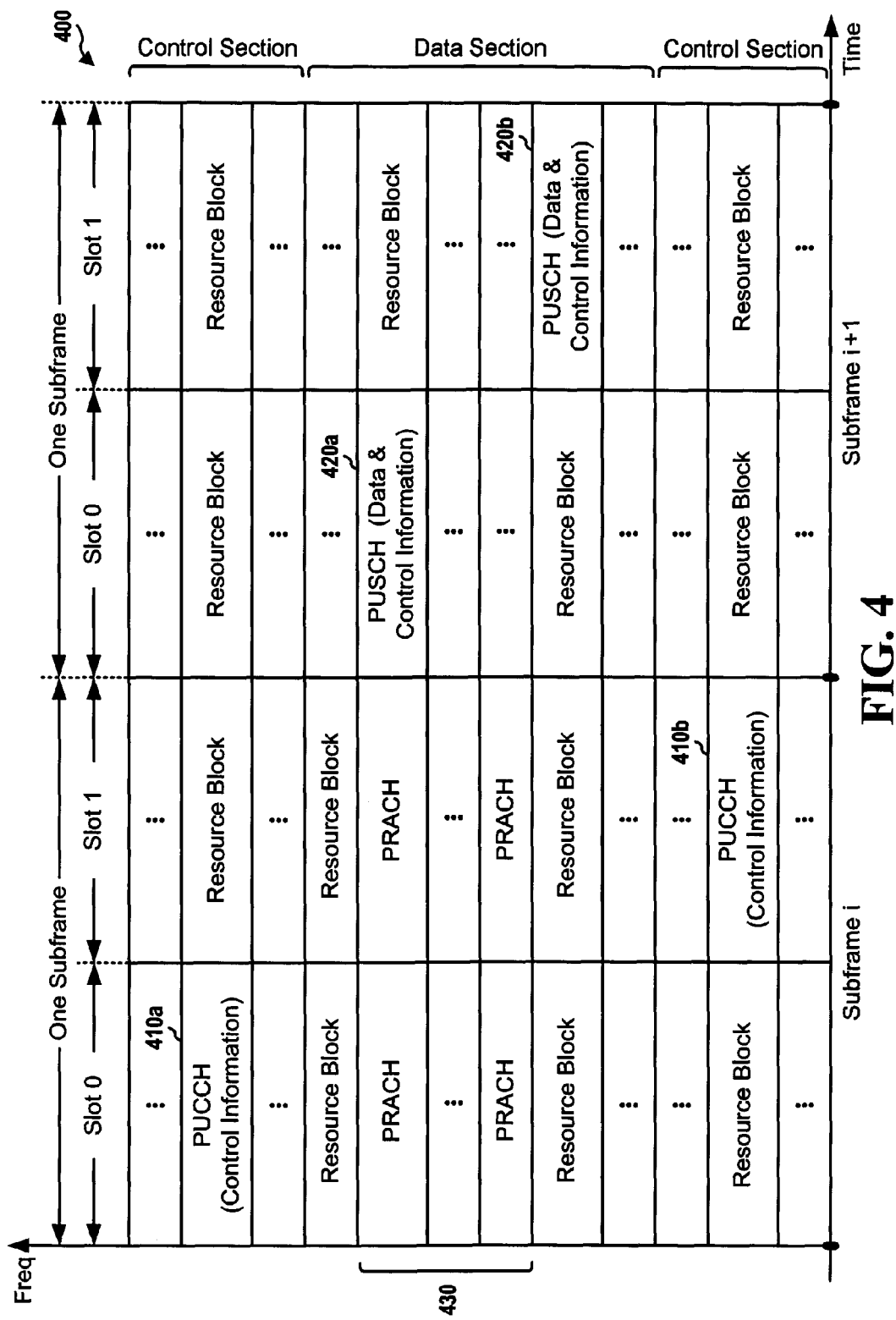
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
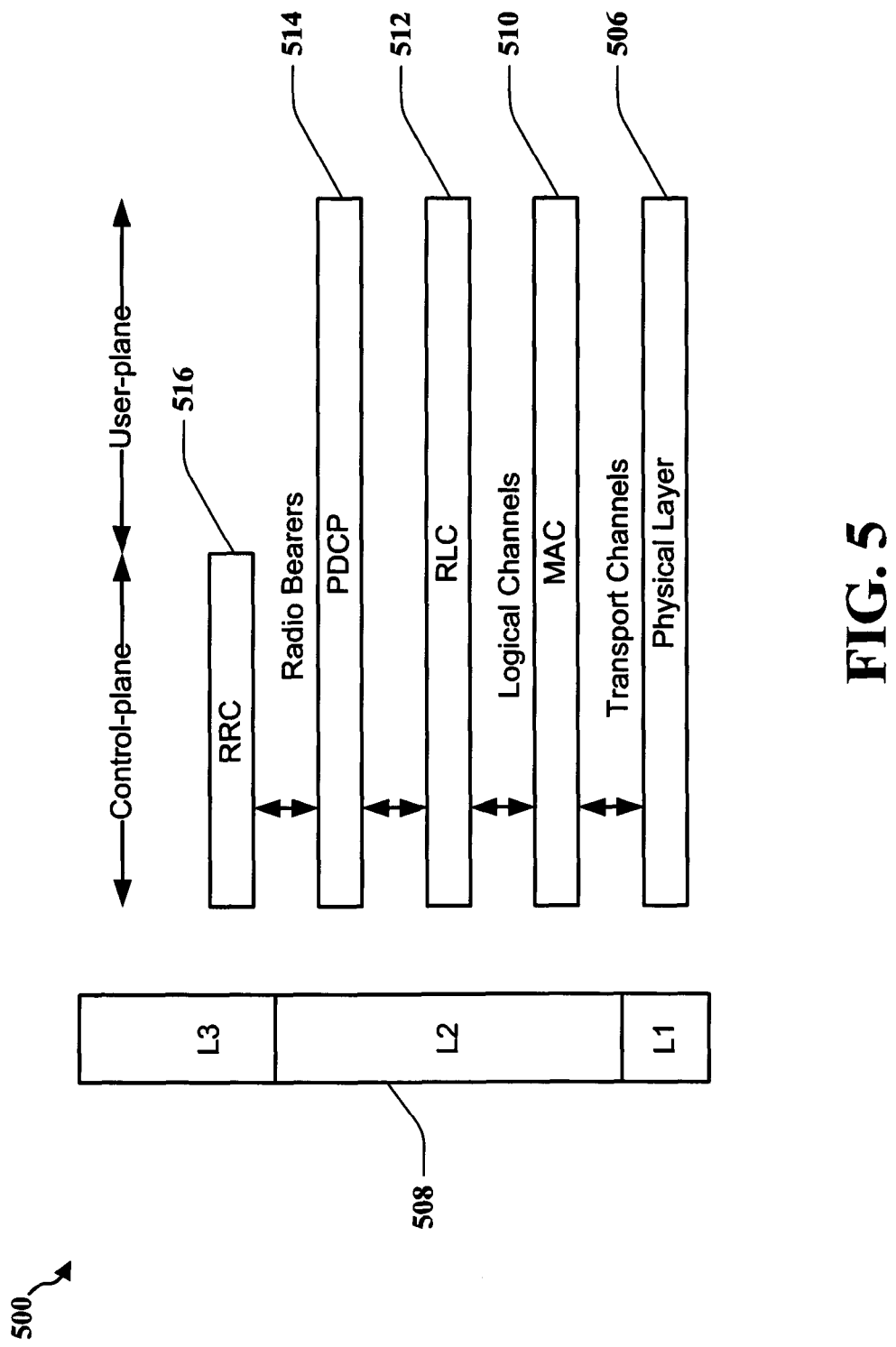
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
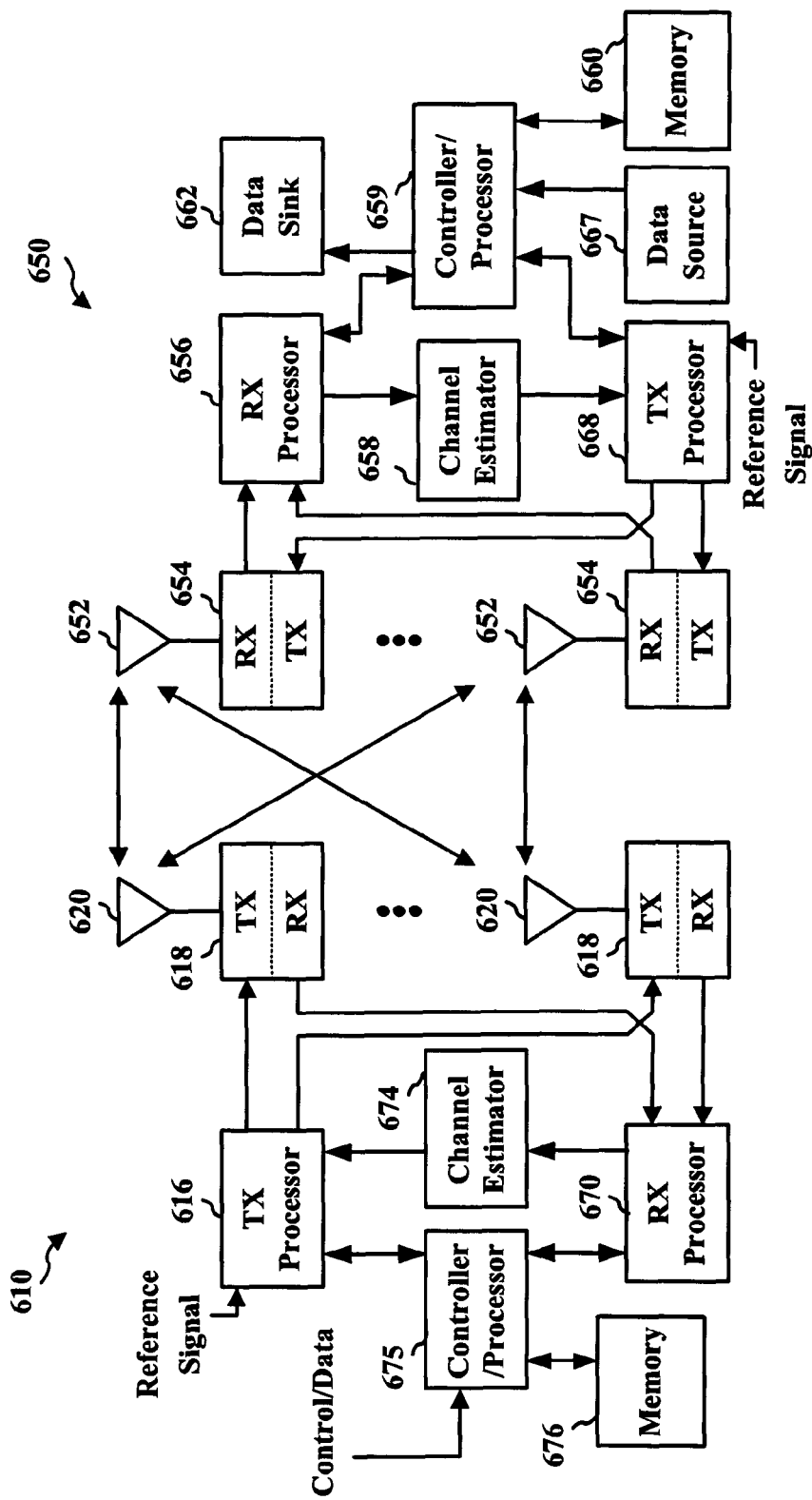
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

When a UE communicates with a first eNB, the UE provides the first eNB with its capabilities for the communication. The UE capabilities include optional capabilities and mandatory/required capabilities. The mandatory/required capabilities may be referred to as Feature Group Indicators (FGIs). The UE supports an FGI when all the features in that group are supported. In LTE, the capabilities are conveyed by the UE in an UE-EUTRA-Capability information element. The optional capabilities may include one of more of the following capabilities:

---

UE-EUTRA-Capability field descriptions

--- accessStratumRelease
Set per the version of the specification.
bandCombinationListEUTRA
One entry corresponding to each supported band combination listed in the same order as in supportedBandCombination.
bandEUTRA
E-UTRA band as defined in TS 36.101.
bandListEUTRA
One entry corresponding to each supported E-UTRA band listed in the same order as in supportedBandListEUTRA.
This field shall include all bands which are indicated in BandCombinationParameters-r10.
CA-BandwidthClass
The CA bandwidth class supported by the UE as defined in TS 36.101.
deviceType
UE may set the value to "noBenFromBatConsumpOpt" when it does not foresee to particularly benefit from NW-based battery consumption optimisation. Absence of this value means that the device does benefit from NW-based battery consumption optimisation.
dtm
Indicates whether the UE supports DTM in GERAN.
e-CSFB-1XRTT
Indicates whether the UE supports enhanced CS fallback to CDMA2000 1xRTT or not.
e-CSFB-ConcPS-Mob1XRTT
Indicates whether the UE supports concurrent enhanced CS fallback to CDMA2000 1xRTT and

| UE-EUTRA-Capability field descriptions |
| --- |

PS handover/redirection to CDMA2000 HRPD.
e-CSFB-dual-1XRTT
Indicates whether the UE supports enhanced CS fallback to CDMA2000 1xRTT for dual Rx/Tx configuration. This bit can only be set to supported if tx-Config1XRTT and rx-Config1XRTT are both set to dual.
enhancedDualLayerTDD-Supported
Indicates whether the UE supports enhanced dual layer (PDSCH transmission mode 8) for TDD or not.
e-RedirectionUTRA-TDD
Indicates whether the UE supports enhanced redirection to UTRA TDD using SIB related to multiple carrier frequencies provided by RRCConnectionRelease or not.
featureGroupIndicators
The definitions of the bits in the bit string are described in Annex B.
halfDuplex
If halfDuplex is set to true, only half duplex operation is supported for the band, otherwise full duplex operation is supported.
interFreqBandList
One entry corresponding to each supported E-UTRA band listed in the same order as in supportedBandListEUTRA.
interFreqNeedForGaps
Indicates need for measurement gaps when operating on the E-UTRA band given by the entry in bandListEUTRA or on the E-UTRA band combination given by the entry in bandCombinationListEUTRA and measuring on the E-UTRA band given by the entry in interFreqBandList.
interFreqProximityIndication
Indicates whether the UE supports proximity indication for inter-frequency E-UTRAN CSG member cells.
interFreqSI-AcquisitionForHO
Indicates whether the UE supports, upon configuration of si-RequestForHO by the network, acquisition and reporting of relevant information using autonomous gaps by reading the SI from a neighbouring inter-frequency cell.
interRAT-BandList
One entry corresponding to each supported band of another RAT listed in the same order as in the interRAT-Parameters.
interRAT-NeedForGaps
Indicates need for DL measurement gaps when operating on the E-UTRA band given by the entry in bandListEUTRA or on the E-UTRA band combination given by the entry in bandCombinationListEUTRA and measuring on the inter-RAT band given by the entry in the interRAT-BandList.
interRAT-PS-HO-ToGERAN
Indicates whether the UE supports inter-RAT PS handover to GERAN or not.
intraFreqProximityIndication
Indicates whether the UE supports proximity indication for intra-frequency E-UTRAN CSG member cells.
intraFreqSI-AcquisitionForHO
Indicates whether the UE supports, upon configuration of si-RequestForHO by the network, acquisition and reporting of relevant information using autonomous gaps by reading the SI from a neighbouring intra-frequency cell.
loggedMeasurementsIdle
Indicates whether the UE supports logged measurements in Idle mode.
maxNumberROHC-ContextSessions
Set to the maximum number of concurrently active ROHC contexts supported by the UE, excluding context sessions that leave all headers uncompressed. cs2 corresponds with 2 (context sessions), cs4 corresponds with 4 and so on. The network ignores this field if the UE supports none of the ROHC profiles in supportedROHC-Profiles.
MIMO-CapabilityDL
The number of supported layers for spatial multiplexing in DL.
MIMO-CapabilityUL
The number of supported layers for spatial multiplexing in UL.
NonContiguousUL-RA-WithinCC-List
One entry corresponding to each supported E-UTRA band listed in the same order as in supportedBandListEUTRA.
rach-Report
Indicates whether the UE supports delivery of rachReport.
standaloneGNSS-Location
Indicates whether the UE is equipped with a standalone GNSS receiver that may be used to provide detailed location information in RRC measurement report and logged measurements.
SupportedBandGERAN
GERAN band as defined in TS 45.005.
SupportedBandList1XRTT
One entry corresponding to each supported CDMA2000 1xRTT band class.
SupportedBandListHRPD
One entry corresponding to each supported CDMA2000 HRPD band class.
SupportedBandUTRA-FDD
UTRA band as defined in TS 25.101.
SupportedBandUTRA-TDD128
UTRA band as defined in TS 25.102.

-continued

| UE-EUTRA-Capability field descriptions |
|---|

SupportedBandUTRA-TDD384
UTRA band as defined in TS 25.102.
SupportedBandUTRA-TDD768
UTRA band as defined in TS 25.102.
ue-Category
UE category as defined in TS 36.306. If the UE includes ue-Category-v1020 (category 6 to 8) it shall also include rf-Parameters-v1020 even if it does not support carrier aggregation.
ue-TxAntennaSelectionSupported
TRUE indicates that the UE is capable of supporting UE transmit antenna selection as described in TS 36.213.
utran-ProximityIndication
Indicates whether the UE supports proximity indication for UTRAN CSG member cells.
utran-SI-AcquisitionForHO
Indicates whether the UE supports, upon configuration of si-RequestForHO by the network, acquisition and reporting of relevant information using autonomous gaps by reading the SI from a neighbouring UMTS cell.

The FGIs may include one or more of the following capabilities:

| Index of indicator (bit number) | Definition (description of the supported functionality, if indicator set to one) |
|---|---|
| 1 (leftmost bit) | Intra-subframe frequency hopping for PUSCH scheduled by UL grant<br>DCI format 3a (TPC commands for PUCCH and PUSCH with single bit power adjustments)<br>PDSCH transmission mode 5<br>Aperiodic CQI/PMI/RI reporting on PUSCH: Mode 2-0 - UE selected subband CQI without PMI<br>Aperiodic CQI/PMI/RI reporting on PUSCH: Mode 2-2 - UE selected subband CQI with multiple PMI |
| 2 | Simultaneous CQI and ACK/NACK on PUCCH, i.e. PUCCH format 2a and 2b<br>Absolute TPC command for PUSCH<br>Resource allocation type 1 for PDSCH<br>Periodic CQI/PMI/RI reporting on PUCCH: Mode 2-0 - UE selected subband CQI without PMI<br>Periodic CQI/PMI/RI reporting on PUCCH: Mode 2-1 - UE selected subband CQI with single PMI |
| 3 | 5 bit RLC UM SN<br>7 bit PDCP SN |
| 4 | Short DRX cycle |
| 5 | Long DRX cycle<br>DRX command MAC control element |
| 6 | Prioritised bit rate |
| 7 | RLC UM |
| 8 | EUTRA RRC_CONNECTED to UTRA CELL_DCH PS handover |
| 9 | EUTRA RRC_CONNECTED to GERAN GSM_Dedicated handover |
| 10 | EUTRA RRC_CONNECTED to GERAN (Packet_) Idle by Cell Change Order<br>EUTRA RRC_CONNECTED to GERAN (Packet_) Idle by Cell Change Order with NACC (Network Assisted Cell Change) |
| 11 | EUTRA RRC_CONNECTED to CDMA2000 1xRTT CS Active handover |
| 12 | EUTRA RRC_CONNECTED to CDMA2000 HRPD Active handover |
| 13 | Inter-frequency handover (within FDD or TDD) |
| 14 | Measurement reporting event: Event A4 - Neighbour > threshold<br>Measurement reporting event: Event A5 - Serving < threshold1 & Neighbour > threshold2 |
| 15 | Measurement reporting event: Event B1 - Neighbour > threshold |
| 16 | non-ANR related intra-frequency periodical measurement reporting;<br>non-ANR related inter-frequency periodical measurement reporting, if the UE has set bit number 25 to 1; and<br>non-ANR related inter-RAT periodical measurement reporting for UTRAN, GERAN, 1xRTT or HRPD, if the UE has set bit number 22, 23, 24 or 26 to 1, respectively.<br>NOTE: "non-ANR related periodical measurement reporting" corresponds only to periodical trigger type with purpose set to reportStrongestCells. Event triggered periodical reporting (i.e., event trigger type with reportAmount > 1) is a mandatory functionality of event triggered reporting and therefore not the subject of this bit. |
| 17 | Periodical measurement reporting for SON/ANR<br>ANR related intra-frequency measurement reporting events |
| 18 | ANR related inter-frequency measurement reporting events |
| 19 | ANR related inter-RAT measurement reporting events |

-continued

| Index of indicator (bit number) | Definition (description of the supported functionality, if indicator set to one) |
|---|---|
| 20 | If bit number 7 is set to 0:<br>SRB1 and SRB2 for DCCH + 8x AM DRB<br>If bit number 7 is set to 1:<br>SRB1 and SRB2 for DCCH + 8x AM DRB<br>SRB1 and SRB2 for DCCH + 5x AM DRB + 3x UM DRB<br>NOTE: UE which indicate support for a DRB combination also support all subsets of the DRB combination. Therefore, release of DRB(s) never results in an unsupported DRB combination. |
| 21 | Predefined intra- and inter-subframe frequency hopping for PUSCH with N_sb > 1<br>Predefined inter-subframe frequency hopping for PUSCH with N_sb > 1 |
| 22 | UTRAN measurements, reporting and measurement reporting event B2 in E-UTRA connected mode |
| 23 | GERAN measurements, reporting and measurement reporting event B2 in E-UTRA connected mode |
| 24 | 1xRTT measurements, reporting and measurement reporting event B2 in E-UTRA connected mode |
| 25 | Inter-frequency measurements and reporting in E-UTRA connected mode<br>NOTE: The UE setting this bit to 1 and indicating support for FDD and TDD frequency bands in the UE capability signalling implements and is tested for<br>FDD measurements while the UE is in TDD, and for TDD measurements while the UE is in FDD. |
| 26 | HRPD measurements, reporting and measurement reporting event B2 in E-UTRA connected mode |
| 27 | EUTRA RRC_CONNECTED to UTRA CELL_DCH CS handover |
| 28 | TTI bundling |
| 29 | Semi-Persistent Scheduling |
| 30 | Handover between FDD and TDD |

The FGIs may additionally include one or more of the following capabilities:

| Index of indicator | Definition (description of the supported functionality, if indicator set to one) |
|---|---|
| 101 (leftmost bit) | DMRS with OCC (orthogonal cover code) and SGH (sequence group hopping) disabling |
| 102 | Trigger type 1 SRS (aperiodic SRS) transmission (Up to X ports)<br>NOTE: X = number of supported layers on given band |
| 103 | PDSCH transmission mode 9 when up to 4 CSI reference signal ports are configured |
| 104 | PDSCH transmission mode 9 for TDD when 8 CSI reference signal ports are configured |
| 105 | Periodic CQI/PMI/RI reporting on PUCCH: Mode 2-0 - UE selected subband CQI without PMI, when PDSCH transmission mode 9 is configured<br>Periodic CQI/PMI/RI reporting on PUCCH: Mode 2-1 - UE selected subband CQI with single PMI, when PDSCH transmission mode 9 and up to 4 CSI reference signal ports are configured |
| 106 | Periodic CQI/PMI/RI/PTI reporting on PUCCH: Mode 2-1 - UE selected subband CQI with single PMI, when PDSCH transmission mode 9 and 8 CSI reference signal ports are configured |
| 107 | Aperiodic CQI/PMI/RI reporting on PUSCH: Mode 2-0 - UE selected subband CQI without PMI, when PDSCH transmission mode 9 is configured<br>Aperiodic CQI/PMI/RI reporting on PUSCH: Mode 2-2 - UE selected subband CQI with multiple PMI, when PDSCH transmission mode 9 and up to 4 CSI reference signal ports are configured |
| 108 | Aperiodic CQI/PMI/RI reporting on PUSCH: Mode 2-2 - UE selected subband CQI with multiple PMI, when PDSCH transmission mode 9 and 8 CSI reference signal ports are configured |
| 109 | Periodic CQI/PMI/RI reporting on PUCCH Mode 1-1, submode 1 |
| 110 | Periodic CQI/PMI/RI reporting on PUCCH Mode 1-1, submode 2 |
| 111 | Measurement reporting trigger Event A6 |

-continued

| Index of indicator | Definition (description of the supported functionality, if indicator set to one) |
|---|---|
| 112 | SCell addition within the Handover to EUTRA procedure |
| 113 | Trigger type 0 SRS (periodic SRS) transmission on X Serving Cells<br>NOTE: X = number of supported component carriers in a given band combination |
| 114 | Reporting of both UTRA CPICH RSCP and Ec/N0 in a Measurement Report |
| 115 | time domain ICIC RLM/RRM measurement subframe restriction for the serving cell<br>time domain ICIC RRM measurement subframe restriction for neighbour cells<br>time domain ICIC CSI measurement subframe restriction |
| 116 | Relative transmit phase continuity for spatial multiplexing in UL |

While specific capabilities are listed, the set of capabilities of a UE for communicating with a particular cell (also referred to as sector) may include other capabilities not listed supra. When the UE moves from the first eNB to a second eNB, the first eNB provides the second eNB the UE capabilities directly or indirectly via other network entities. However, if the UE capabilities have changed for the communication with the second eNB, the second eNB will not be aware of the changed capabilities. For example, assume the first eNB provides FDD communication and the second eNB provides TDD communication. The UE may have FDD capabilities for FDD communication and TDD capabilities for TDD communication. When the UE moves from the first eNB to the second eNB, the first eNB provides the FDD capability information to the second eNB. The second eNB will not be aware that the UE has TDD capabilities for TDD communication and will therefore communicate with the UE based on the FDD capabilities instead of the TDD capabilities. As such, methods are needed for updating UE capabilities.

The following methods are applicable when a UE moves from a first eNB associated with a first set of capabilities to a second eNB associated with a second set of capabilities. In the description related to FIGS. 7-13, for simplicity in describing the exemplary methods, the first eNB is assumed to communicate through FDD and the second eNB is assumed to communicate through TDD. The reverse may also be the case, and therefore the first eNB (source) may communicate through TDD and the second eNB (target) may communicate through FDD. However, in general, all the methods described infra are applicable when the UE moves from a first eNB associated with a first set of capabilities to a second eNB associated with a second set of capabilities where the first and second set of capabilities are different. Furthermore, all the methods described infra are applicable when the UE moves from a first cell/sector with a first set of capabilities to a second cell/sector associated with a second set of capabilities where the first and second set of capabilities are different. The first and second cells/sectors may or may not belong to the same eNB.

Figure 7:
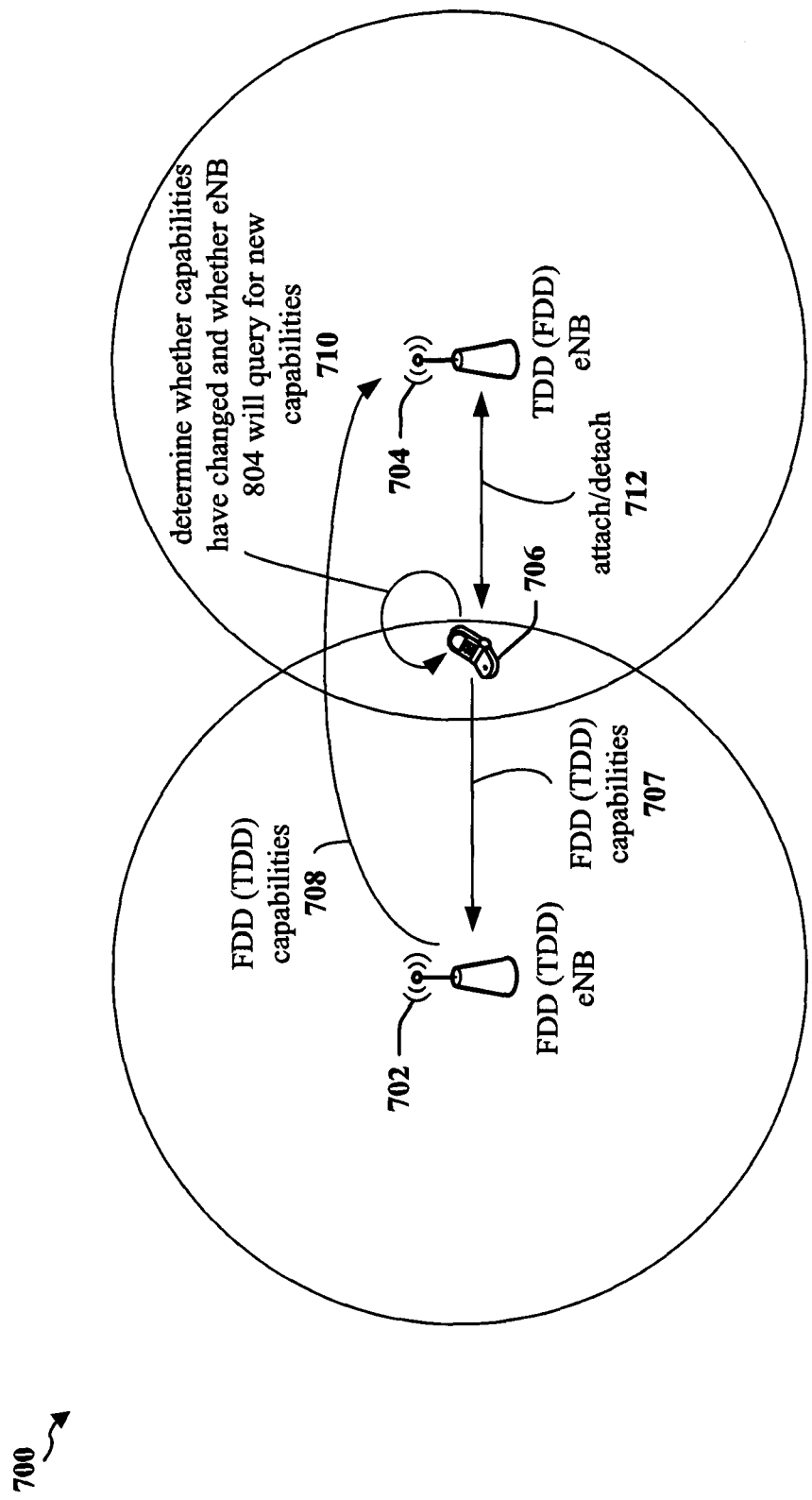
FIG. 7 is a diagram for illustrating a first exemplary method.

FIG. 7 is a diagram 700 for illustrating a first exemplary method. While the UE 706 is in communication with the FDD eNB 702, the UE provides 707 the FDD eNB 702 with its FDD capabilities. At some point, the UE 706 moves from being served by the FDD eNB 702 to being served by the TDD eNB 704. The FDD eNB 702 provides 708 the FDD capabilities of the UE 706 to the TDD eNB 704. According to the first exemplary method, the UE 706 determines whether its capabilities have changed for the TDD network (i.e., they are different from that used for communication with the FDD eNB 702) and whether the FDD eNB 702 will query for its TDD capabilities before the UE moves from the FDD eNB 702 to the TDD eNB 704 or whether the TDD eNB 704 will query for its TDD capabilities after the UE moves from the FDD eNB 702 to the TDD eNB 704. If the UE 706 determines that its capabilities have changed for the TDD network and that both the FDD eNB 702 and the TDD eNB 704 will not query for its TDD capabilities, the UE 706 performs an attach 712, preceded by an optional detach 712, with the TDD eNB 704 in order to cause the TDD eNB 704 to query for its TDD capabilities.

Figure 8:
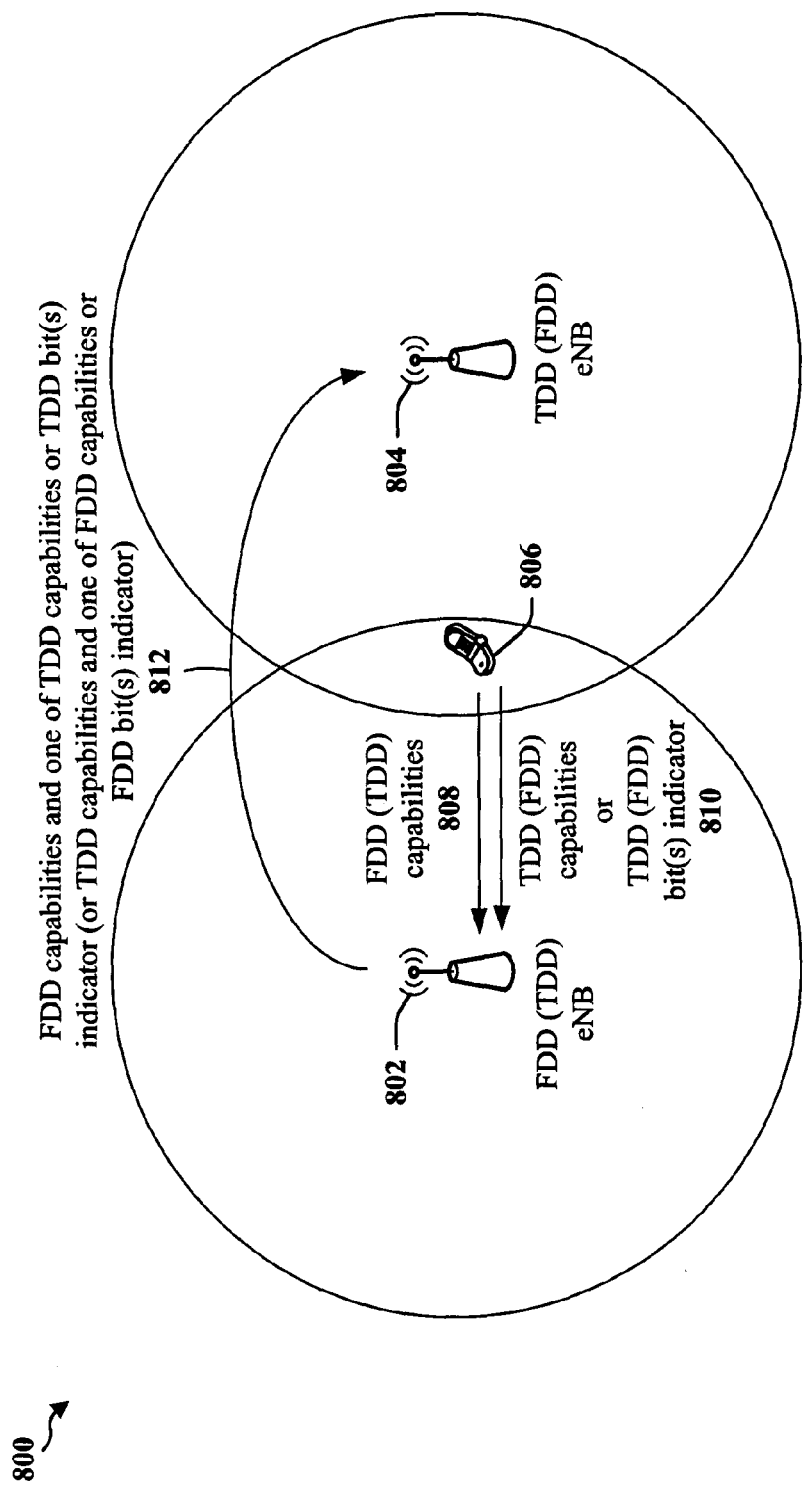
FIG. 8 is a diagram for illustrating a second exemplary method.

As discussed infra in relation to FIG. 8 (and FIG. 11), information regarding the TDD capabilities can be provided to the FDD eNB 702 before the handover to the TDD eNB 704.

FIG. 8 is a diagram 800 for illustrating a second exemplary method. While the UE 806 is in communication with the FDD eNB 802, the UE 806 provides 808 the FDD eNB 802 with its FDD capabilities. According to the second exemplary method, the UE 806 also provides 810 its TDD capabilities to the FDD eNB 802. Alternatively, the UE 806 may indicate 810 in a TDD bit(s) indicator whether some or all of its TDD capabilities are changed from the FDD capabilities. The UE 806 may provide 810 the TDD capabilities or bit(s) indicator when the UE 806 provides its FDD capabilities to the FDD eNB 802. Alternatively, the UE 806 may provide 810 the TDD capabilities or bit(s) indicator when the UE 806 is going to move (e.g., in handoff) from the FDD eNB 802 to the TDD eNB 804.

If the UE 806 provides its TDD capabilities to the FDD eNB 802 and the FDD eNB 802 determines that the UE 806 is going to move from being served by the FDD eNB 802 to being served by the TDD eNB 804, the FDD eNB 802 may provide 812 the TDD capabilities, and optionally the FDD capabilities, of the UE 806 to the TDD eNB 804. If the UE 806 provides a TDD bit(s) indicator to the FDD eNB 802 and the FDD eNB 802 determines that the UE 806 is going to move from being served by the FDD eNB 802 to being served by the TDD eNB 804, the FDD eNB 802 can provide 812 the FDD capabilities and the TDD bit(s) indicator to the TDD eNB 804.

The TDD bit(s) indicator may be one or more bits used for indicating whether a subset of the optional capabilities and a subset of the FGIs are different for TDD as compared to FDD. For example, if the TDD bit(s) indicator is one bit, the one bit may indicate whether a subset (which may be all) of the capabilities are the same or are different. For another example, if the TDD bit(s) indicator includes two bits, a first bit may indicate whether the optional capabilities are the same or are different, and a second bit may indicate whether the FGIs are the same or are different. Other configurations are possible.

If the TDD bit(s) indicator indicates that the TDD capabilities of the UE 806 are the same as the FDD capabilities (i.e., that the capabilities of the UE 806 are unchanged in the move of the UE 806 from the FDD eNB 802 to the TDD eNB 804), the TDD eNB 804 will not query the UE 806 for updated capabilities. If the TDD bit(s) indicator indicates that a predetermined subset of the TDD capabilities of the UE 806 are the same as the same predetermined subset of FDD capabilities (i.e., that a predetermined subset of the capabilities of the UE 806 are unchanged in the move of the UE 806 from the FDD eNB 802 to the TDD eNB 804), the TDD eNB 804 may configure the UE 806 according to the determined subset of UE capabilities and may delay querying the UE 806 for updated capabilities until they are needed. However, if the TDD bit(s) indicator indicates that the TDD capabilities of the UE 806 are different from the FDD capabilities (i.e., that the capabilities of the UE 806 have changed in the move of the UE 806 from the FDD eNB 802 to the TDD eNB 804), the TDD eNB 804 queries the UE 806 for its TDD capabilities.

Figure 9:
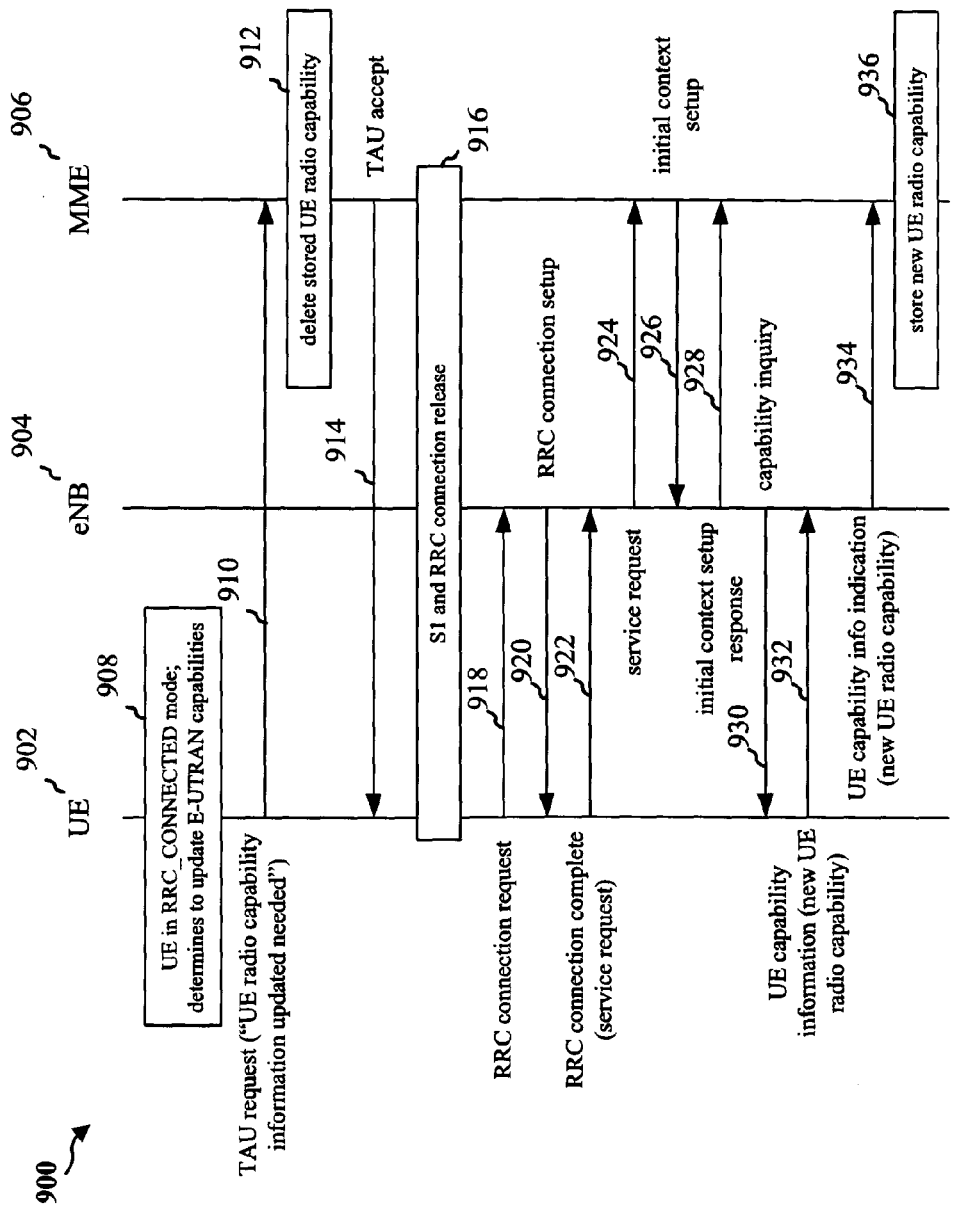
FIG. 9 is a diagram for illustrating a third exemplary method.

FIG. 9 is a diagram 900 for illustrating a third exemplary method. The method may be performed upon a UE move from an FDD eNB to a TDD eNB; upon a UE move from a TDD eNB to an FDD eNB; upon capability changes with respect to GSM EDGE Radio Access Network (GERAN), E-UTRAN, and cdma2000; and upon a move from a first cell/sector to a second cell/sector (which may or may not belong to the same eNB) for which the UE has different capabilities. In step 908, when the UE 902 is in an RRC_CONNECTED mode, the UE determines to update its E-UTRAN capabilities. In step 910, the UE sends a tracking area update (TAU) request (through the eNB 904) to the MME 906. The TAU request includes a flag that indicates that the TAU request was made by the UE 902 in order to update its capability information (e.g., upon handoff to the eNB 904). In step 912, the MME 906 deletes the UE radio capability information stored for the UE 902. In step 914, the MME 906 sends a TAU accept message to acknowledge that the UE radio capability information update is needed. In step 916, immediately after step 914, the MME 906 sends an UE context release message to the eNB 904, which sends an RRC connection release message to the UE 902. Accordingly, in step 916, the Si and RRC connections are released. The UE moves to the RRC_IDLE mode upon receiving the RRC connection release message from the eNB 904. In one configuration, step 916 may be performed even if the UE is receiving data, but only if the UE is not in a voice call. In such a configuration, step 916 may be delayed until the voice call is finished. In step 918, immediately after step 916, the UE 902 sends an RRC connection request message to the eNB 904. In step 920, the eNB 904 sends an RRC connection setup message to the UE 902. In step 922, the UE 902 sends an RRC connection complete (service request) message to the eNB 922. In step 924, the eNB 904 sends a service request to the MME 906. In step 926, the MME 906 responds with an initial context setup message. The initial context setup message does not include UE capability information of the UE 902, as the MME 906 had previously deleted such information in step 912. In step 928, the eNB 904 sends an initial context setup response message to the MME 906. In step 930, the eNB 904 sends a capability inquiry to the UE 902. In step 932, the UE 902 sends its UE capability information to the eNB 904. The UE capability information sent in step 932 may include the capability information for different network systems, including FDD capability information, TDD capability information, GERAN capability information, cdma2000 capability information, and any other capability information for other applicable network systems. As such, even if the eNB 904 is a TDD eNB, the UE 902 may send its capability information for TDD LTE as well as for FDD LTE, GERAN, and cdma2000. In step 934, the eNB 904 sends an indication that it has received new capability information and provides the new capability information to the MME 906. In step 936, the MME 906 stores the new capability information of the UE 902.

Figure 10:
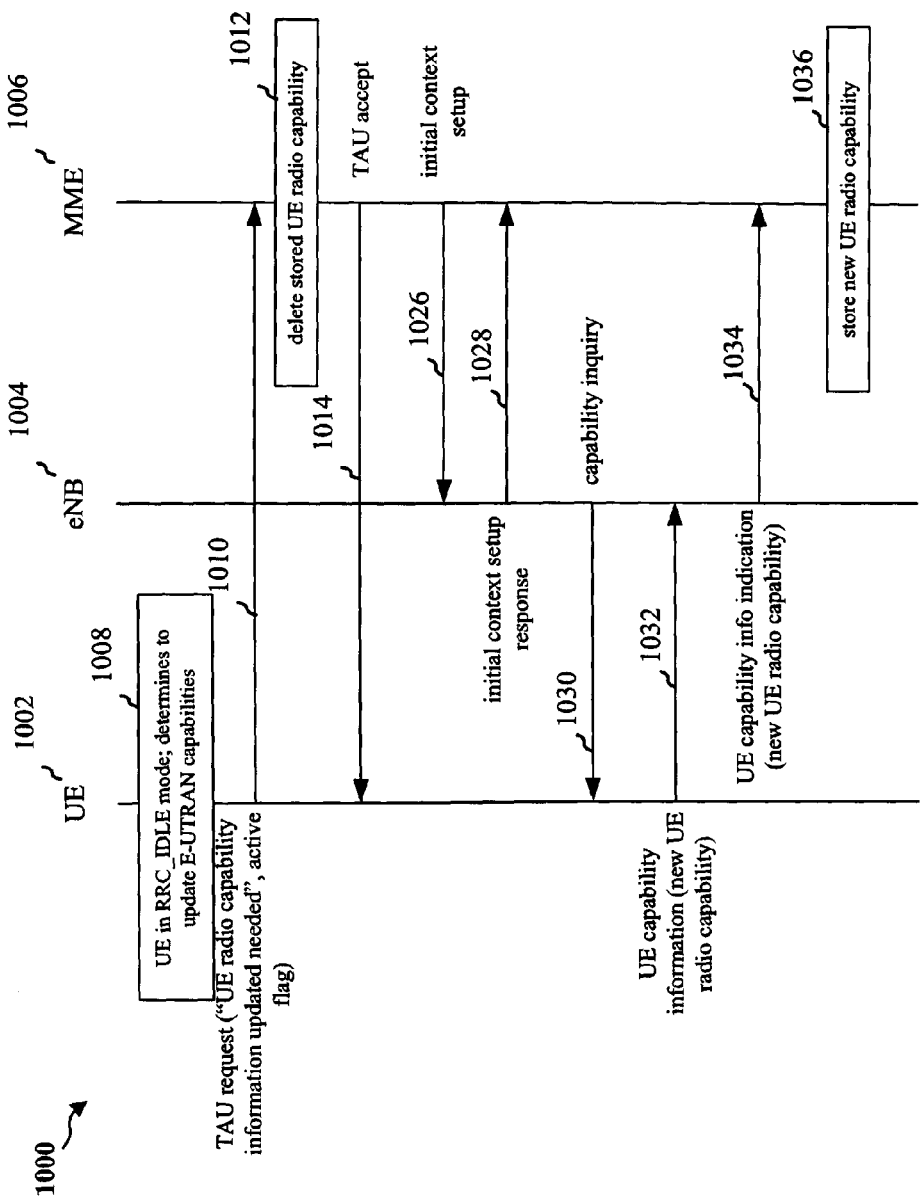
FIG. 10 is a diagram for illustrating a fourth exemplary method.

FIG. 10 is a diagram 1000 for illustrating a fourth exemplary method. The method may be performed upon a UE move from an FDD eNB to a TDD eNB; upon a UE move from a TDD eNB to an FDD eNB; upon capability changes with respect to GERAN, E-UTRAN, and cdma2000; and upon a move from a first cell/sector to a second cell/sector (which may or may not belong to the same eNB) for which the UE has different capabilities. In step 1008, when the UE 1002 is in an RRC_IDLE mode, the UE determines to update its E-UTRAN capabilities. In step 1010, the UE sends a TAU request (through the eNB 1004) to the MME 1006. The TAU request includes a flag that indicates that the TAU request was made by the UE 1002 in order to update its capability information (e.g., upon handoff to the eNB 1004) and an active flag that mandates that the MME perform step 1026. In step 1012, the MME 1006 deletes the UE radio capability information stored for the UE 1002. In step 1014, the MME 1006 sends a TAU accept message to acknowledge that the UE radio capability information update is needed. Following step 1014, the S1 and RRC connections are not released, the RRC connection release and setup are not performed, and therefore a new service request is not made by the UE 1002 (i.e., steps 916-924 are not performed). In step 1026, the MME 1006 sends an initial context setup message. The initial context setup message does not include UE capability information of the UE 1002, as the MME 1006 had previously deleted such information in step 1012. In step 1028, the eNB 1004 sends an initial context setup response message to the MME 1006. In step 1030, the eNB 1004 sends a capability inquiry to the UE 1002. In step 1032, the UE 1002 sends its UE capability information to the eNB 1004. The UE capability information sent in step 1032 may include the capability information for different network systems, including FDD capability information, TDD capability information, GERAN capability information, cdma2000 capability information, and any other capability information for other applicable network systems. As such, even if the eNB 1004 is a TDD eNB, the UE 1002 may send its capability information for TDD LTE as well as for FDD LTE, GERAN, and cdma2000. In step 1034, the eNB 1004 sends an indication that it has received new capability information and provides the new capability information to the MME 1006. In step 1036, the MME 1006 stores the new capability information of the UE 1002.

Figure 11:
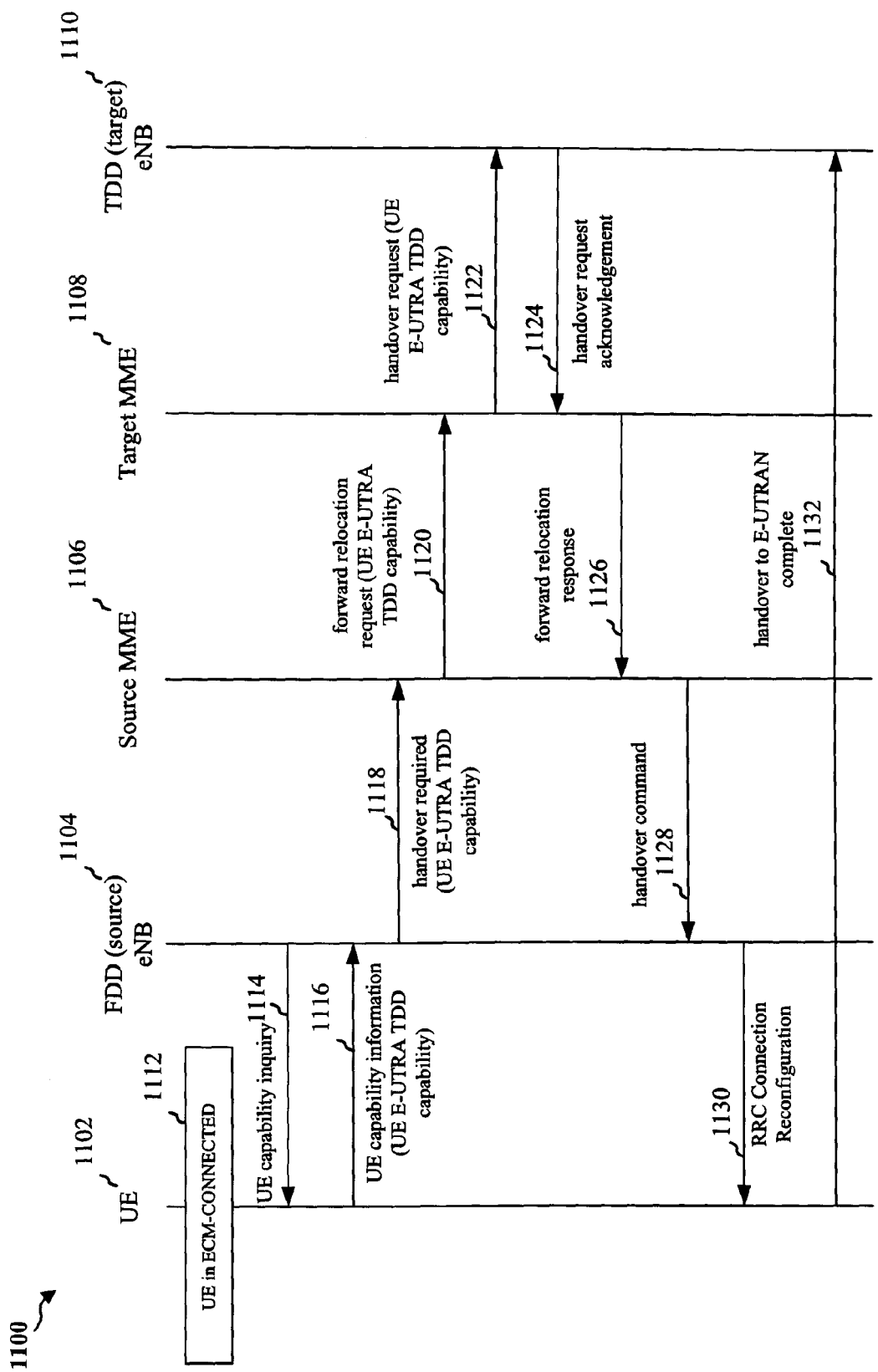
FIG. 11 is a diagram for illustrating a fifth exemplary method.

FIG. 11 is a diagram 1100 for illustrating a fifth exemplary method. In step 1112, the UE is in ECM-CONNECTED mode. In step 1114, the FDD eNB 1104 determines that the UE 1102 should be handed over to the TDD eNB 1110, and therefore the FDD eNB 1104 queries the UE 1102 for TDD capability information. In one configuration, the FDD eNB 1104 determines whether the UE 1102 has different TDD capabilities than FDD capabilities before querying the UE 1102 for the TDD capability information. The FDD eNB 1104 may obtain this information by determining whether the UE 1102 has set a flag indicating that the FDD capabilities of the UE are different from the TDD capabilities of the UE. A new FGI may be defined to include a flag for indicating TDD/FDD capability differences. In step 1116, the UE 1102 sends its TDD capability information to the FDD eNB 1104. In step 1118, the FDD eNB 1104 sends a handover required message to the source MME 1106, which is the MME for the FDD eNB 1104. The handover required message includes the TDD capability information. In step 1120, the source MME 1106 sends a forward relocation request message to the target MME 1108, assuming the target MME 1108 is a different MME than the source MME 1106. The forward relocation request message includes the TDD capability information. In step 1122, the target MME 1108 sends a handover request to the TDD eNB 1110. The handover request includes the TDD capability information. In step 1124, the TDD eNB 1110 responds to the target MME 1108 with a handover request acknowledgement. In step 1126, the target MME 1108 sends a forward relocation response message to the source MME 1106. In step 1128, the source MME 1106 sends a handover command to the FDD eNB 1104. In step 1130, the FDD eNB 1104 sends an RRC connection reconfiguration message to the UE 1102. In step 1132, the UE 1102 sends a message to the TDD eNB 1110 indicating that the handover to the E-UTRAN is complete. As such, after step 1132, the UE 1102 moves to the TDD eNB 1110, thus completing the handover.

In FIG. 11, the source eNB 1104 is an FDD eNB and the target eNB 1110 is a TDD eNB, but the exemplary method described in relation to FIG. 11 is applicable when the source eNB 1104 is a TDD eNB and the target eNB 1110 is an FDD eNB. In addition, generally, the exemplary method described in relation to FIG. 11 is applicable when the UE has a first set of capabilities for communication with the source eNB 1104 and a second set of capabilities for communication with the target eNB 1110. Furthermore, the exemplary method described in relation to FIG. 11 is applicable when the UE moves from a first cell with a first set of capabilities to a second cell with a second set of capabilities. The first cell may belong to the source eNB 1104 and the second cell may belong to the target eNB 1110. The eNBs 1104, 1110 may be different. Alternatively, they may be the same eNB in which the eNB has multiple cells.

Figure 12:
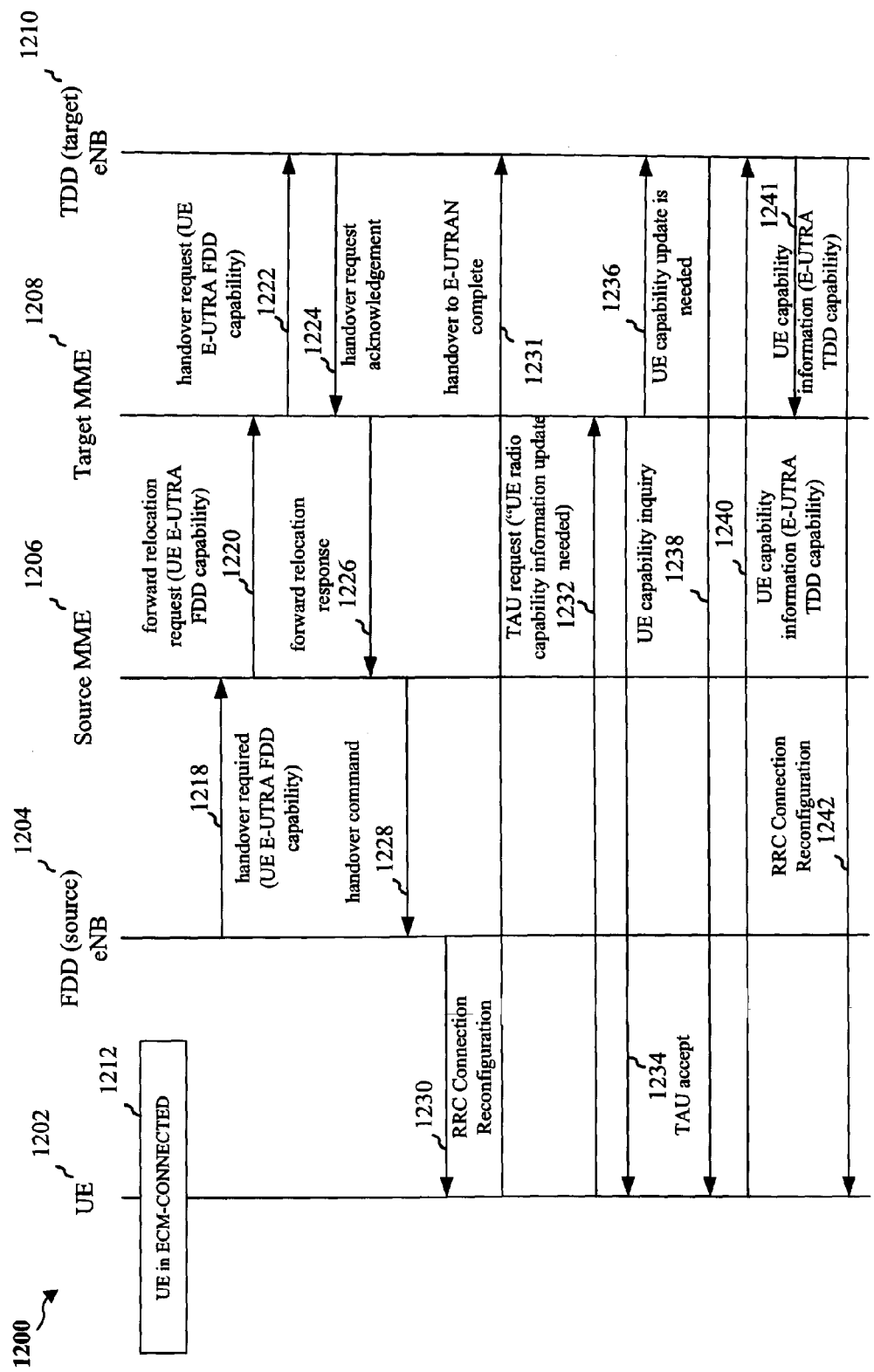
FIG. 12 is a diagram for illustrating a sixth exemplary method.

FIG. 12 is a diagram 1200 for illustrating a sixth exemplary method. In step 1212, the UE is in ECM-CONNECTED mode. As such, the UE 1202 is communicating with the FDD eNB 1204 (e.g., unicast, multicast, broadcast). In step 1218, the FDD eNB 1204 determines that the UE 1202 should be handed over to the TDD eNB 1210, and therefore the FDD eNB 1204 sends a handover required message to the source MME 1206, which is the MME for the FDD eNB 1204. The handover required message includes the previously received FDD capability information. In step 1220, the source MME 1206 sends a forward relocation request message to the target MME 1208, assuming the target MME 1208 is a different MME than the source MME 1206. The forward relocation request message includes the FDD capability information. In step 1222, the target MME 1208 sends a handover request to the TDD eNB 1210. The handover request includes the FDD capability information. In step 1224, the TDD eNB 1210 responds to the target MME 1208 with a handover request acknowledgement. In step 1226, the target MME 1208 sends a forward relocation response message to the source MME 1206. In step 1228, the source MME 1206 sends a handover command to the FDD eNB 1204. In step 1230, the FDD eNB 1204 sends an RRC connection reconfiguration message to the UE 1202. In step 1231, the UE 1202 sends a message to the TDD eNB 1210 indicating that the handover to the E-UTRAN is complete. As such, after step 1231, the UE 1202 moves to the TDD eNB 1210, thus completing the handover. In step 1232, the UE 1202 sends a TAU request (through the target eNB 1110) to the target MME 1208. The TAU request indicates that the capability information needs to be updated. In step 1234, the target MME 1208 may optionally respond to the UE 1202 with a TAU accept message. In step 1236, the target MME 1208 informs the TDD eNB 1210 that the capability information needs to be updated for the UE 1202. In step 1238, the TDD eNB 1210 queries the UE 1202 for its capability information. In step 1240, the UE 1202 sends its capability information to the target eNB 1210. In step 1241, the TDD eNB 1210 sends the target MME 1208 the capability information received from the UE 1202. In step 1242, the TDD eNB 1210 may reconfigure the RRC connection using the updated capability information.

In FIG. 12, the source eNB 1204 is an FDD eNB and the target eNB 1210 is a TDD eNB, but the exemplary method described in relation to FIG. 12 is applicable when the source eNB 1204 is a TDD eNB and the target eNB 1210 is an FDD eNB. In addition, generally, the exemplary method described in relation to FIG. 12 is applicable when the UE has a first set of capabilities for communication with the source eNB 1204 and a second set of capabilities for communication with the target eNB 1210. Furthermore, the exemplary method described in relation to FIG. 12 is applicable when the UE moves from a first cell with a first set of capabilities to a second cell with a second set of capabilities. The first cell may belong to the source eNB 1204 and the second cell may belong to the target eNB 1210. The eNBs 1204, 1210 may be different. Alternatively, they may be the same eNB in which the eNB has multiple cells.

Figure 13:
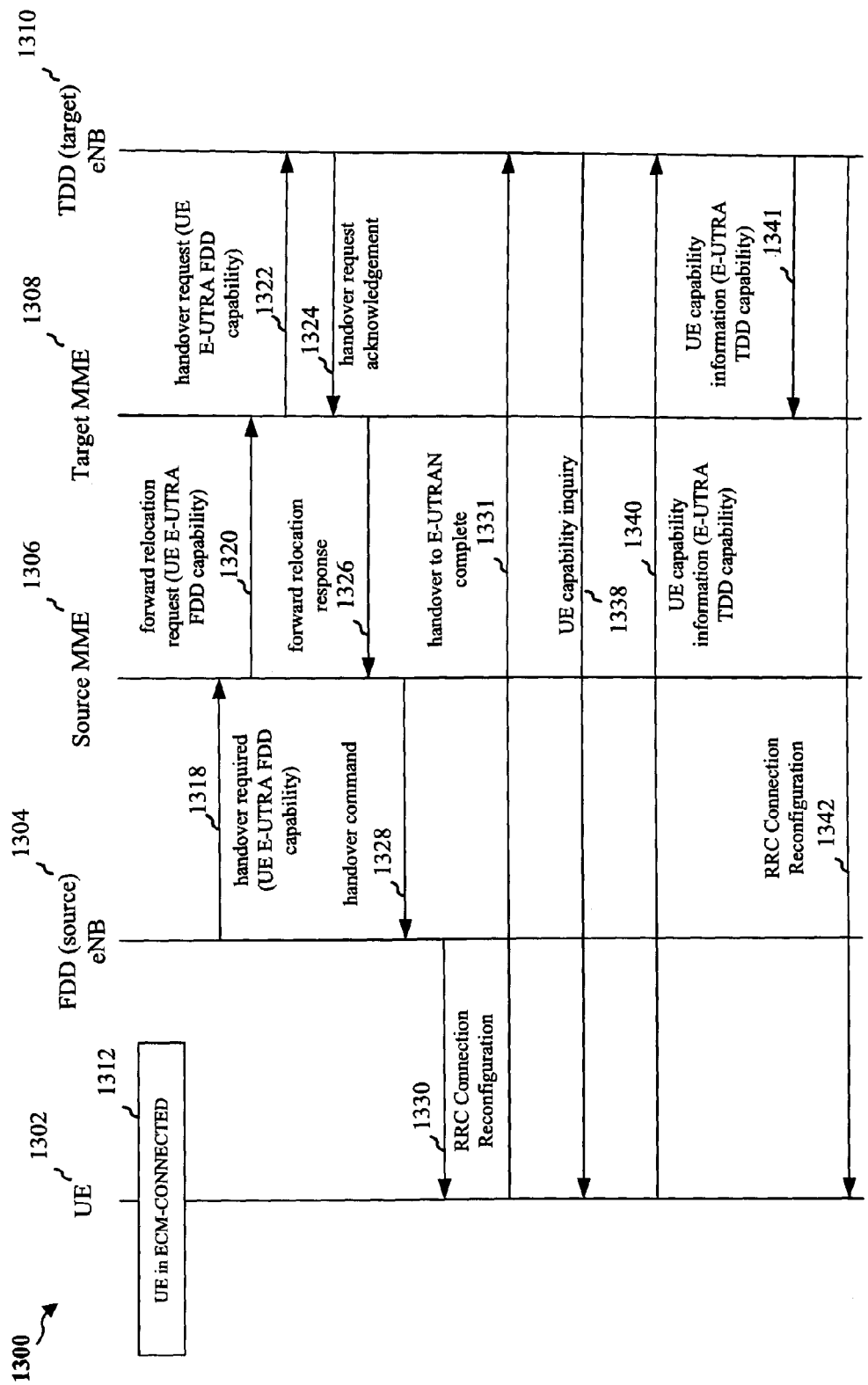
FIG. 13 is a diagram for illustrating a seventh exemplary method.

FIG. 13 is a diagram 1300 for illustrating a seventh exemplary method. In step 1312, the UE is in ECM-CONNECTED mode. As such, the UE 1302 is communicating with the FDD eNB 1304 (e.g., unicast, multicast, broadcast). In step 1318, the FDD eNB 1304 determines that the UE 1302 should be handed over to the TDD eNB 1310, and therefore the FDD eNB 1304 sends a handover required message to the source MME 1306, which is the MME for the FDD eNB 1304. The handover required message includes the previously received FDD capability information. In step 1320, the source MME 1306 sends a forward relocation request message to the target MME 1308, assuming the target MME 1308 is a different MME than the source MME 1306. The forward relocation request message includes the FDD capability information. In step 1322, the target MME 1308 sends a handover request to the TDD eNB 1310. The handover request includes the FDD capability information. In step 1324, the TDD eNB 1310 responds to the target MME 1308 with a handover request acknowledgement. The TDD eNB 1310 constructs the handover request acknowledgement based on a minimum/common set of capabilities rather than the received FDD capability information. The TDD eNB 1310 determines whether the UE 1302 has different TDD capabilities than FDD capabilities before determining to base its handover request acknowledgement on a minimum/common set of capabilities. The TDD eNB 1310 may obtain this information by determining whether the UE 1302 has set a flag indicating that the FDD capabilities of the UE are different from the TDD capabilities of the UE. The flag may be set through a new capability or FGI defined to indicate TDD/FDD capability differences. For example, if the UE 1302 indicates that its TDD capabilities are the same as the FDD capabilities, the TDD eNB 1310 may construct the handover request acknowledgement based on the received FDD capabilities, but if the UE 1302 indicates that its TDD capabilities are different than its FDD capabilities, or when the UE capabilities were not transferred, the TDD eNB 1310 may construct the handover request acknowledgement based on a minimum set of capabilities common to all UEs. The minimum set of capabilities may be based on the active service. For example, a UE capable of voice and of connected mode mobility may need to support a predetermined set of capabilities. In step 1326, the target MME 1308 sends a forward relocation response message to the source MME 1306. In step 1328, the source MME 1306 sends a handover command to the FDD eNB 1304. In step 1330, the FDD eNB 1304 sends an RRC connection reconfiguration message to the UE 1302. In step 1331, the UE 1302 sends a message to the TDD eNB 1310 indicating that the handover to the E-UTRAN is complete. As such, after step 1331, the UE 1302 moves to the TDD eNB 1310, thus completing the handover. In step 1338, the TDD eNB 1310 queries the UE 1302 for its capability information. In step 1340, the UE 1302 sends its capability information to the target eNB 1310. In step 1341, the TDD eNB 1310 sends the target MME 1308 the capability information received from the UE 1302. In step 1342, the TDD eNB 1310 may reconfigure the RRC connection using the updated capability information.

In FIG. 13, the source eNB 1304 is an FDD eNB and the target eNB 1310 is a TDD eNB, but the exemplary method described in relation to FIG. 13 is applicable when the source eNB 1304 is a TDD eNB and the target eNB 1310 is an FDD eNB. In addition, generally, the exemplary method described in relation to FIG. 13 is applicable when the UE has a first set of capabilities for communication with the source eNB 1304 and a second set of capabilities for communication with the target eNB 1310. Furthermore, the exemplary method described in relation to FIG. 13 is applicable when the UE moves from a first cell with a first set of capabilities to a second cell with a second set of capabilities. The first cell may belong to the source eNB 1304 and the second cell may belong to the target eNB 1310. The eNBs 1304, 1310 may be different. Alternatively, they may be the same eNB in which the eNB has multiple cells.

Figure 14:
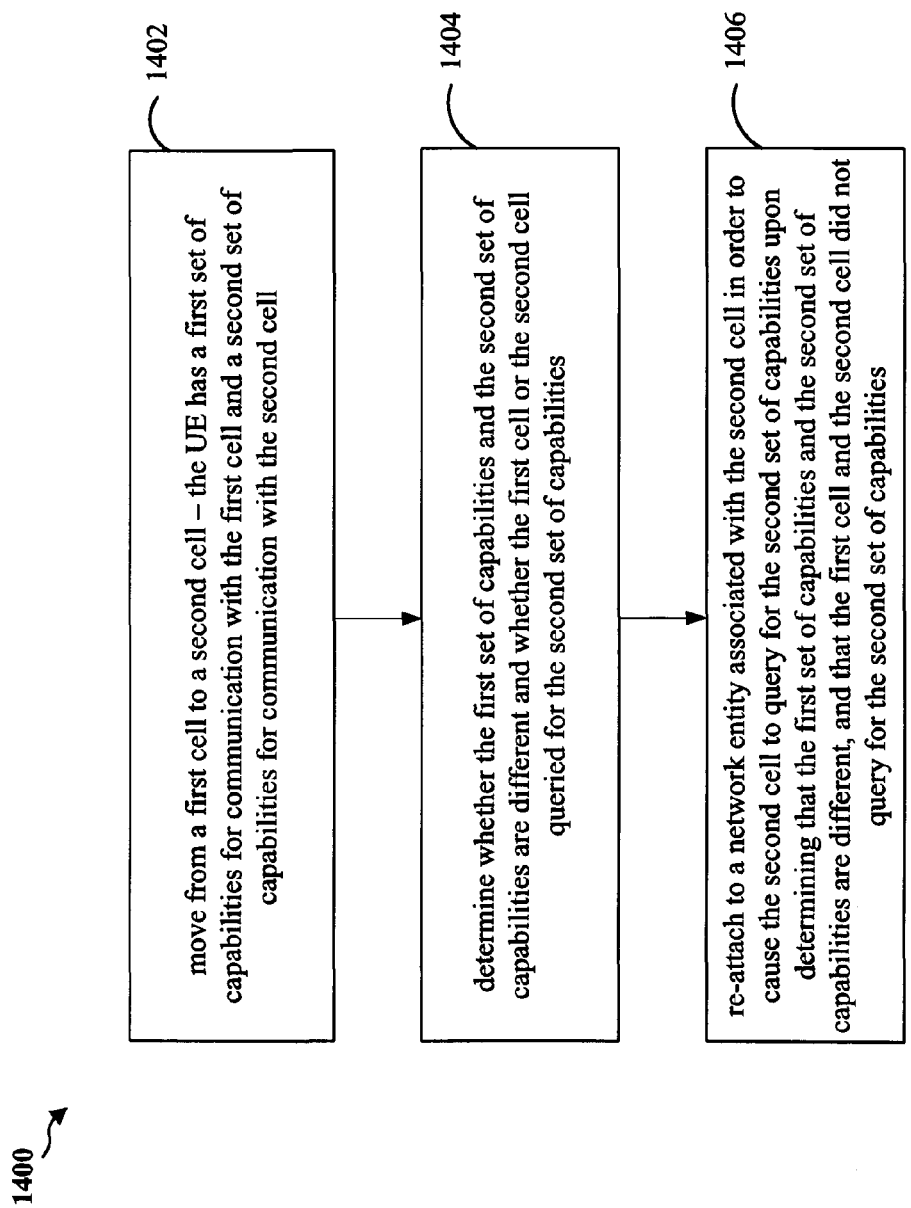
FIG. 14 is a flow chart of a first method of wireless communication.

FIG. 14 is a flow chart 1400 of a method of wireless communication. The method may be performed by a UE. In step 1402, the UE moves from a first cell to a second cell. The UE has a first set of capabilities for communication with the first cell and a second set of capabilities for communication with the second cell. In step 1404, the UE determines whether the first set of capabilities and the second set of capabilities are different and whether the first cell or the second cell queried for the second set of capabilities. In step 1406, the UE re-attaches, after optionally detaching or performing a local detach, to a network entity (e.g., MME) associated with the second cell in order to cause the second cell to query for the second set of capabilities upon determining that the first set of capabilities and the second set of capabilities are different, and that the first cell and the second cell did not query for the second set of capabilities.

Figure 15:
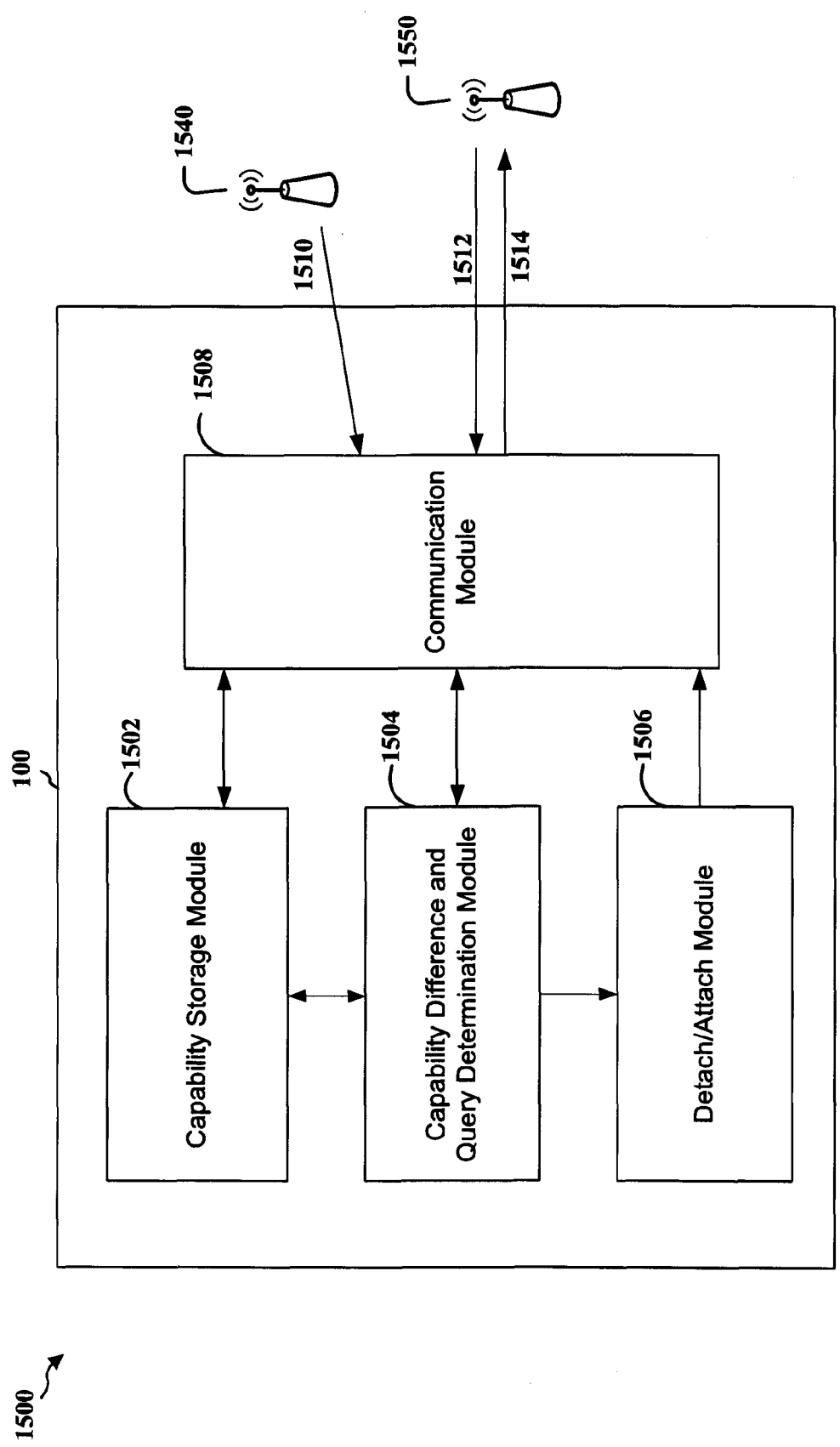
FIG. 15 is a first conceptual data flow diagram illustrating the data flow between different modules/means/components in an exemplary apparatus.

FIG. 15 is a conceptual data flow diagram 1500 illustrating the data flow between different modules/means/components in an exemplary apparatus 100. The apparatus includes a communication module 1508 that handles a move from a first cell 1540 to a second cell 1550. The apparatus further includes a capability storage module 1502 that stores a first set of capabilities for communication with the first cell 1540 and a second set of capabilities for communication with the second cell 1550. The apparatus further includes a capability difference and query determination module 1504 that determines whether the first set of capabilities and the second set of capabilities are different and whether the first cell 1540 queried (or queries) 1510 or the second cell 1550 queried (or queries) 1512 for the second set of capabilities. The apparatus further includes a detach/attach module 1506 that re-attaches to a network entity (e.g., MME) associated with the second cell 1550 in order to cause the second cell 1550 to query 1512 for the second set of capabilities upon determining that the first set of capabilities and the second set of capabilities are different and that the first cell 1540 and the second cell 1550 did not (or does not) query for the second set of capabilities. The communication module 1508 receives the query 1512 from the second cell 1550 for the second set of capabilities and sends 1514 the second set of capabilities to the second cell 1550.

The apparatus may include additional modules that perform each of the steps of the algorithm in the aforementioned flow chart(s). As such, each step in the aforementioned flow chart(s) may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
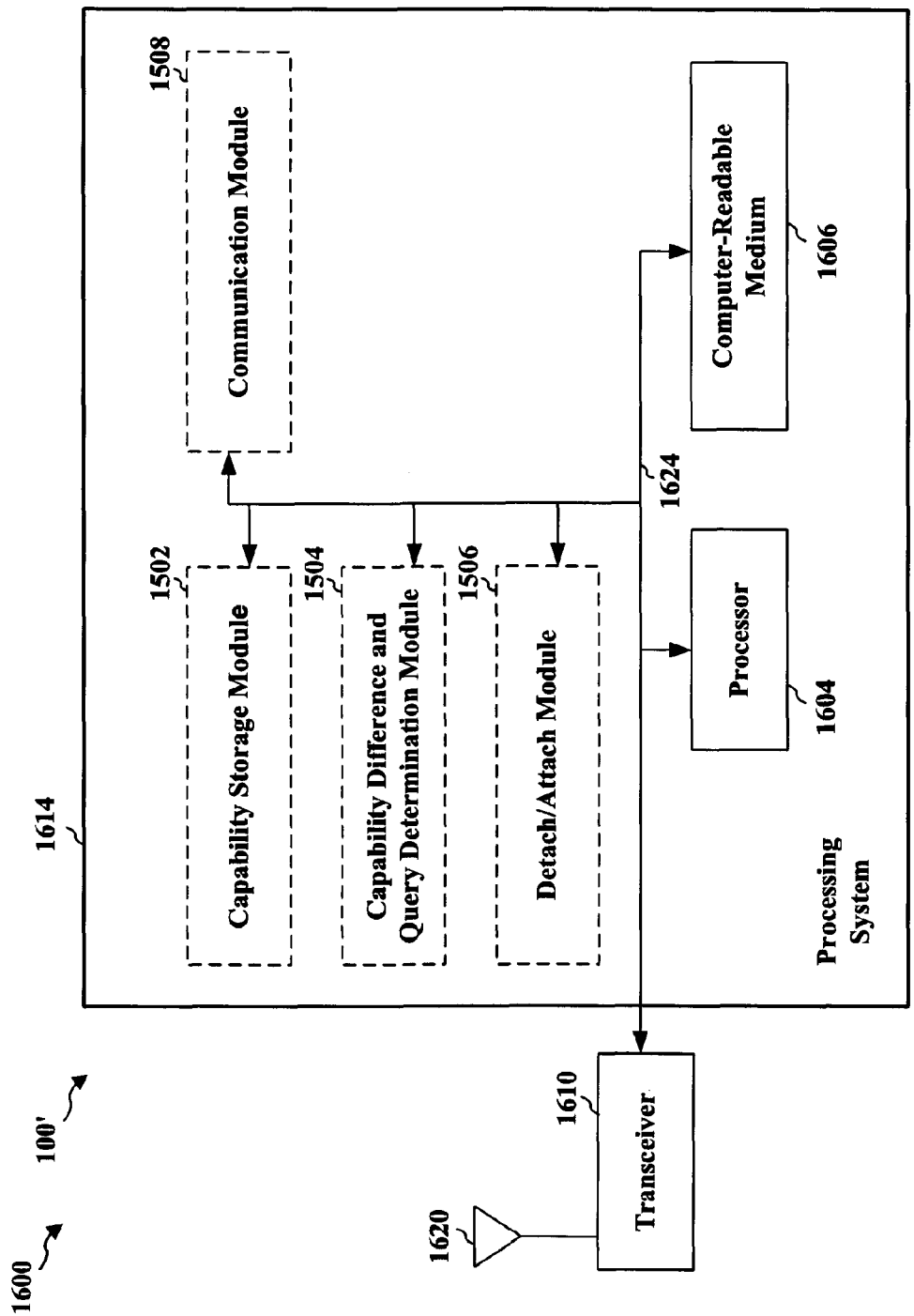
FIG. 16 is a first diagram illustrating an example of a hardware implementation for an apparatus employing a processing system.

FIG. 16 is a diagram illustrating an example of a hardware implementation for an apparatus 100' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1502, 1504, 1506, 1508, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1502, 1504, 1506, and 1508. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 100/100' for wireless communication includes means for moving from a first cell to a second cell. The UE has a first set of capabilities for communication with the first cell and a second set of capabilities for communication with the second cell. The apparatus further includes means for determining whether the first set of capabilities and the second set of capabilities are different and whether the first cell or the second cell queried for the second set of capabilities. The apparatus further includes means for re-attaching to a network entity associated with the second cell in order to cause the second cell to query for the second set of capabilities upon determining that the first set of capabilities and the second set of capabilities are different, and that the first cell and the second cell did not query for the second set of capabilities.

The aforementioned means may be one or more of the aforementioned modules of the apparatus 100 and/or the processing system 1614 of the apparatus 100' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
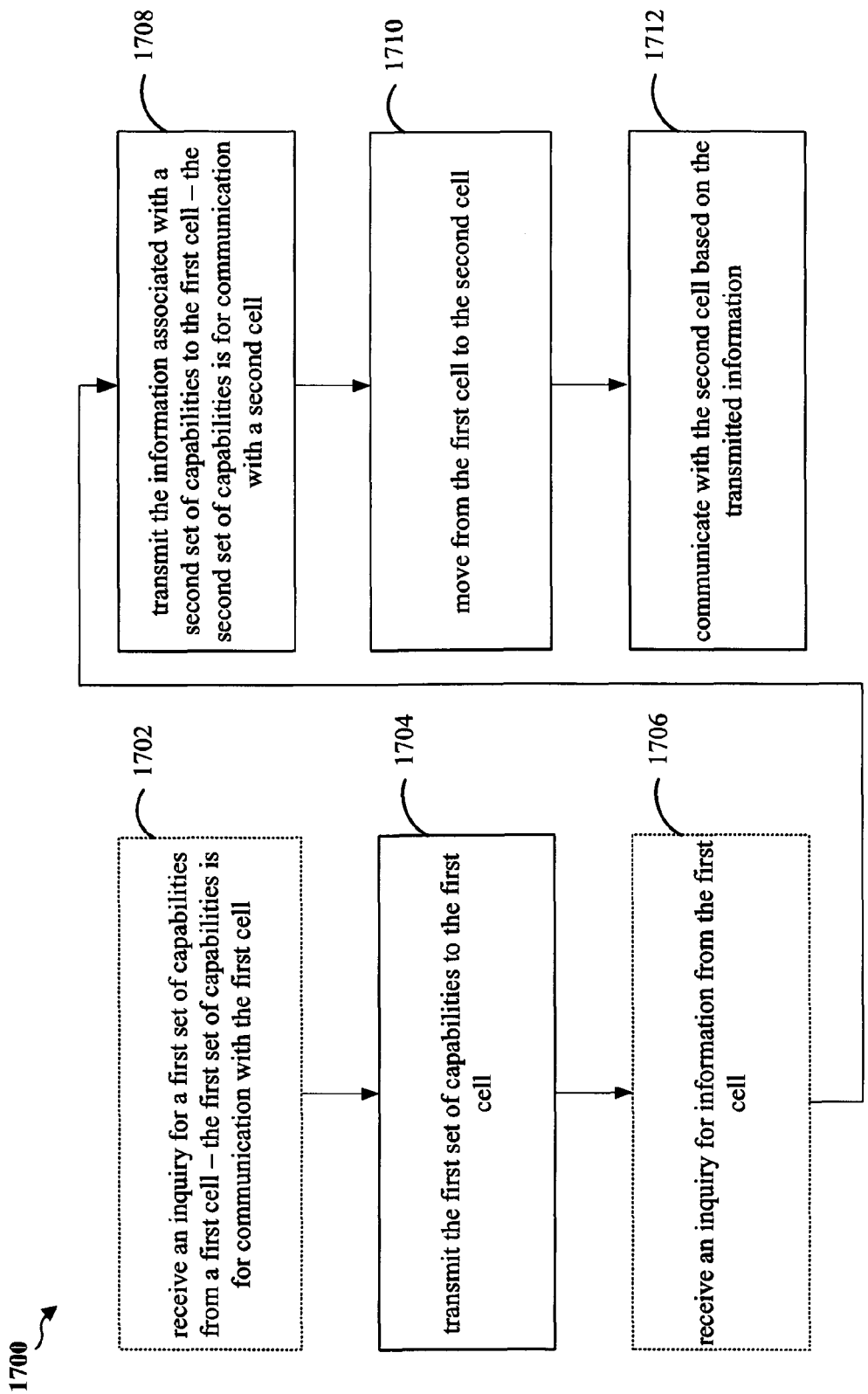
FIG. 17 is a flow chart of a second method of wireless communication.

FIG. 17 is a flow chart 1700 of a method of wireless communication. The method may be performed by a UE. In step 1702, the UE may receive an inquiry for a first set of capabilities from a first cell. The first set of capabilities is for communication with a first cell. In step 1704, the UE transmits the first set of capabilities to the first cell. In step 1706, the UE may receive an inquiry for information from the first cell. In step 1708, the UE transmits information associated with a second set of capabilities to the first cell. The second set of capabilities is for communication with a second cell. In step 1710, the UE moves from the first cell to the second cell. In step 1712, the UE communicates with the second cell based on the transmitted information.

In one configuration, when the UE transmits the first set of capabilities to the first cell, the UE transmits the information associated with the second set of capabilities concurrently with the first set of capabilities. In such a configuration, the UE may not specifically receive an inquiry for the information from the first cell (step 1706). The information may be the second set of capabilities or at least one bit for indicating whether at least one subset of the second set of capabilities is the same as at least one subset of the first set of capabilities. For example, referring to FIG. 8, the first set of capabilities may be FDD capabilities and the second set of capabilities may be TDD capabilities. The information may be the TDD capabilities or a TDD bit(s) indicator. As shown in FIG. 8, the UE 806 provides 808 the FDD capabilities and provides 810 the TDD capabilities or a TDD bit(s) indicator to the FDD eNB 802. For another example, referring to FIG. 11, in step 1114, the UE 1102 receives a specific inquiry for the information associated with the second set of capabilities; in step 1116, the UE 1102 transmits the information associated with the second set of capabilities to the source eNB 1104; and in step 1132, the UE moves (upon the handover) from the source eNB 1104 to the target eNB 1110. Thereafter, the UE 1102 communicates with the target eNB 1110 based on the information.

The at least one bit may be transmitted in a capability within the transmitted first set of capabilities. In one configuration, the first set of capabilities may include capabilities associated with FDD communication and the second set of capabilities may include capabilities associated with TDD communication. In one configuration, the first set of capabilities may include capabilities associated with TDD communication and the second set of capabilities may include capabilities associated with FDD communication. The first cell and the second cell may belong to the same eNB. Alternatively, the first cell may belong to a first eNB and the second cell may belong to a second eNB different than the first eNB. The first eNB and the second eNB belong to the same network or to different networks.

Figure 18:
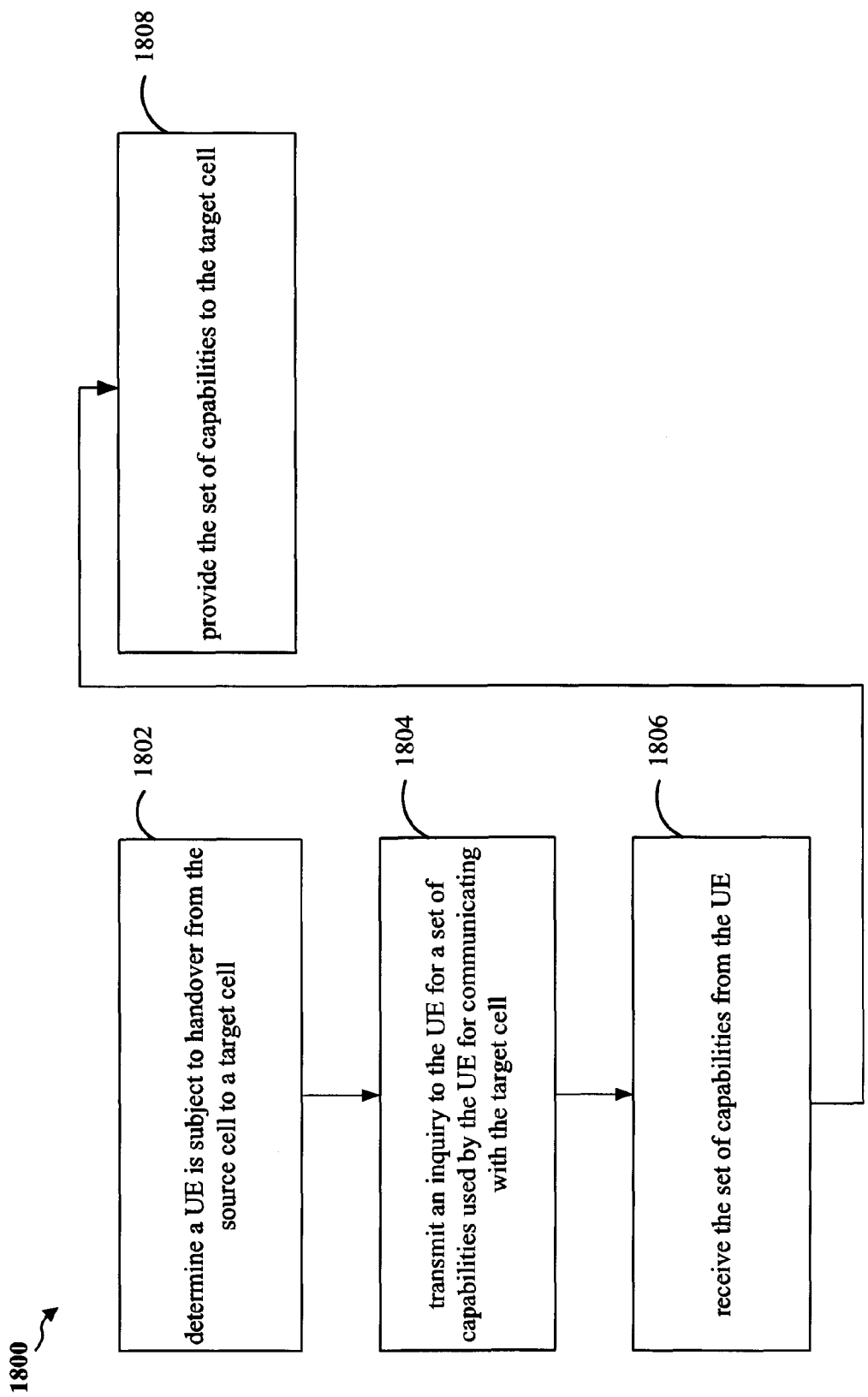
FIG. 18 is a flow chart of a third method of wireless communication.

FIG. 18 is a flow chart 1800 of a method of wireless communication. The method may be performed by a source cell. In step 1802, the source cell determines a UE is subject to a handover from the source cell to a target cell. In step 1804, the source cell transmits an inquiry to the UE for a set of capabilities used by the UE for communicating with the target cell. In step 1806, the source cell receives the set of capabilities from the UE. In step 1808, the source cell provides the set of capabilities to the target cell. The inquiry may indicate that the set of capabilities is for communication with the target cell.

For example, referring to FIG. 11, after the source eNB 1104 determines that the UE 1102 should move from the source eNB 1104 to the target eNB 1110, in step 1114, the source eNB 1104 transmits an inquiry to the UE 1102 for a set of capabilities used by the UE 1102 for communicating with the target eNB 1110. In step 1116, the source eNB 1104 receives the set of capabilities from the UE 1102. In step 1118, the source eNB 1104 provides the set of capabilities to the source MME 1106, which provides the set of capabilities to the target MME 1108 (in step 1120), which provides the set of capabilities to the target eNB 1110 (in step 1122).

Figure 19:
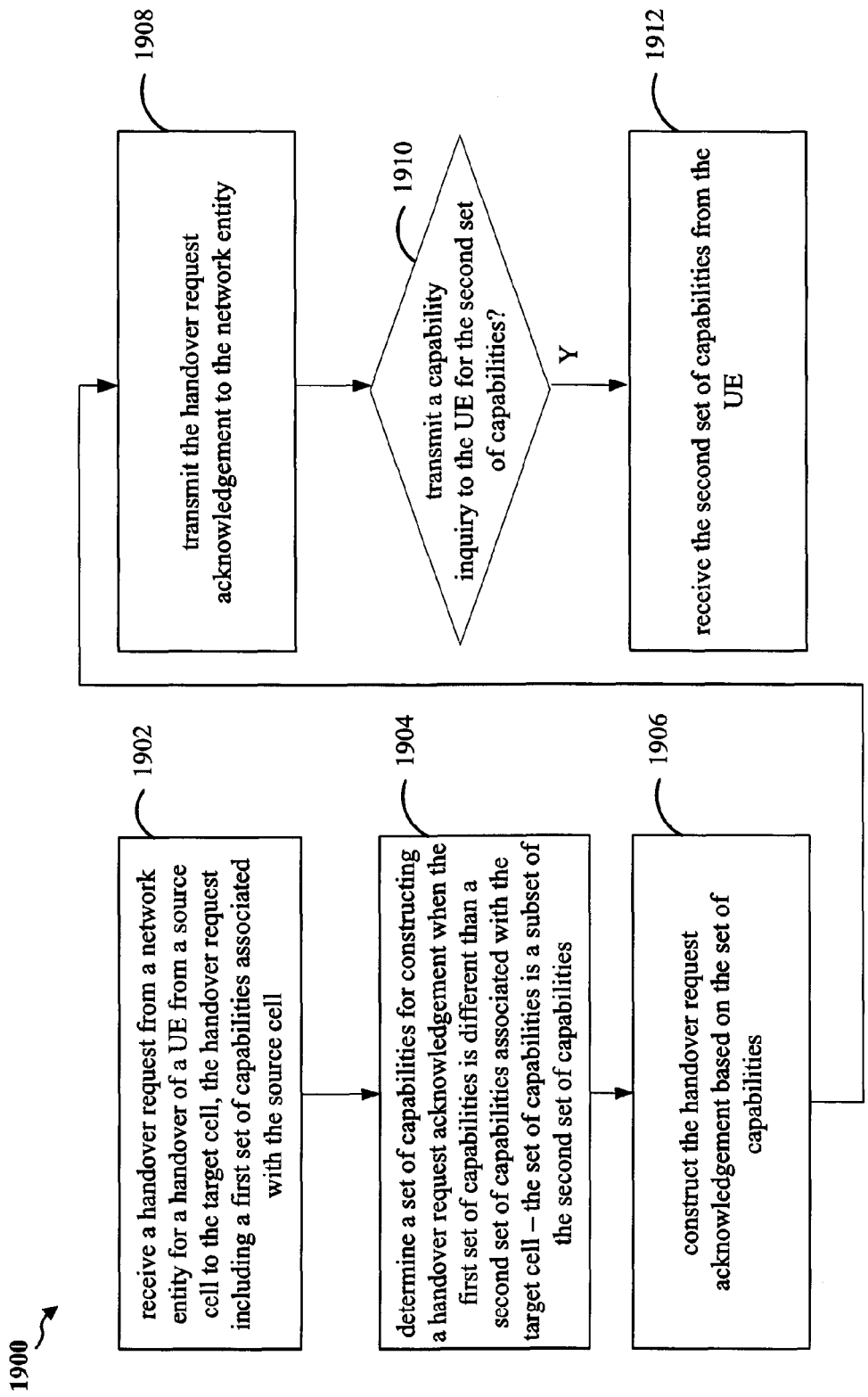
FIG. 19 is a flow chart of a fourth method of wireless communication.

FIG. 19 is a flow chart 1900 of a method of wireless communication. The method may be performed by a target cell. In step 1902, the target cell receives a handover request from a network entity for a handover of a UE from a source cell to the target cell. The handover request includes a first set of capabilities associated with the source cell. In step 1904, the target cell determines a set of capabilities for constructing a handover request acknowledgement when the first set of capabilities is different than a second set of capabilities associated with the target cell. The set of capabilities is a subset of the second set of capabilities. In step 1906, the target cell constructs the handover request acknowledgement based on the set of capabilities. In step 1908, the target cell transmits the handover request acknowledgement to the network entity. In step 1910, the target cell determines whether to transmit a capability inquiry to the UE for the second set of capabilities. If the target cell determines to transmit the capability inquiry to the UE for the second set of capabilities, in step 1912, the target cell receives the second set of capabilities from the UE.

In one configuration, the target cell transmits a capability inquiry to the UE for the second set of capabilities upon a handover of the UE to the target cell. The target cell then receives the second set of capabilities from the UE. In one configuration, the handover request may include an indication of whether at least one subset of a second set of capabilities associated with the target cell is the same as at least one subset of the first set of capabilities. In such a configuration, the set of capabilities may be determined based on the indication. In one configuration, the target cell transmits a capability inquiry to the UE for the second set of capabilities when the indication indicates that the at least one subset of the second set of capabilities is different than the at least one subset of the first set of capabilities, or the at least one subset of the second set of capabilities is the same as the at least one subset of the first set of capabilities and the at least one subset of the second set of capabilities does not include all of the second set of capabilities. The target cell then receives the second set of capabilities from the UE.

For example, referring to FIG. 13, in step 1322, the target eNB 1310 receives a handover request. The handover request includes a first set of capabilities associated with the source eNB 1304. The target eNB 1310 determines a set of capabilities for constructing a handover request acknowledgement when the first set of capabilities is different than a second set of capabilities associated with the target eNB 1310. The set of capabilities is a subset of the second set of capabilities. The target cell constructs the handover request acknowledgement based on the set of capabilities. In step 1324, the target cell transmits the handover request acknowledgement to the network entity. Before step 1338, the target eNB 1310 determines whether to transmit a capability inquiry to the UE 1302 for the second set of capabilities. If the target eNB 1310 determines to transmit (step 1338) the capability inquiry to the UE 1302 for the second set of capabilities, the target eNB receives (in step 1340) the second set of capabilities from the UE 1302.

Figure 20:
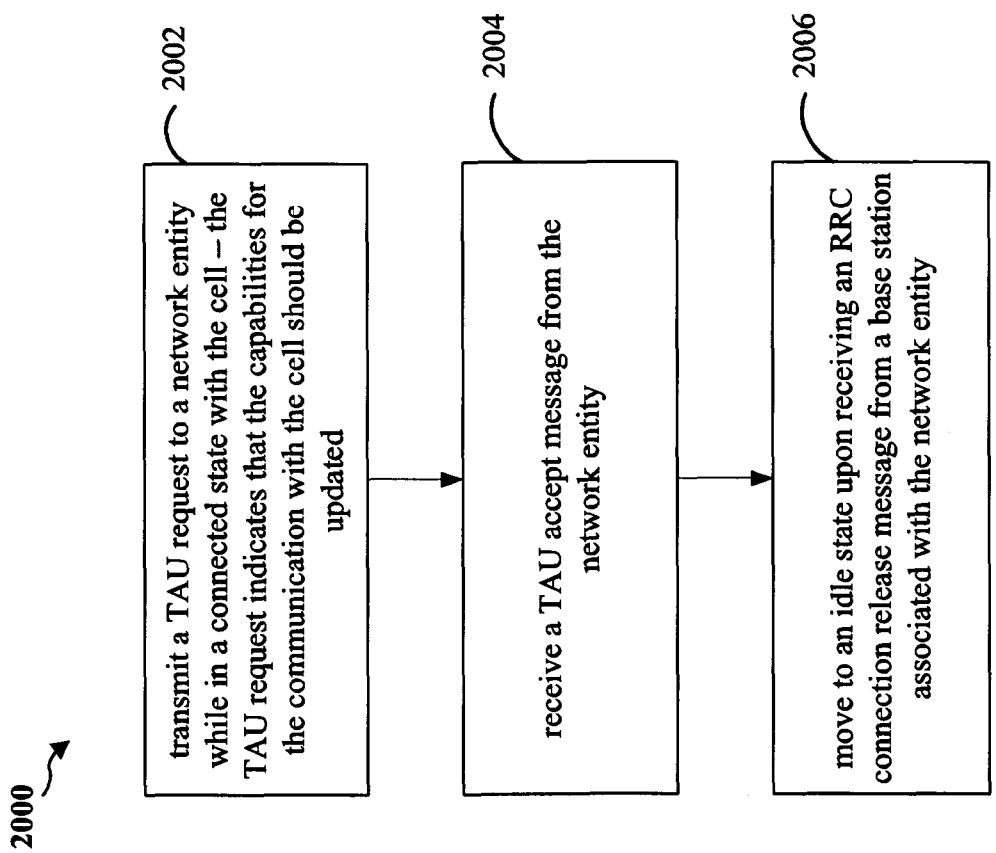
FIG. 20 is a flow chart of a fifth method of wireless communication.

FIG. 20 is a flow chart 2000 of a method of wireless communication. The method may be performed by a UE. In step 2002, the UE transmits a TAU request to a network entity while in a connected state with a cell. The TAU request indicates that the capabilities for the communication with the cell should be updated. In step 2004, the UE receives a TAU accept message from the network entity. In step 2006, the UE moves to an idle state upon receiving an RRC connection release message from a base station associated with the network entity. The UE may move from the connected state to the idle state immediately upon receiving the RRC connection release message.

For example, referring to FIG. 9, in step 910, the UE 902 transmits a TAU request to the MME 906 while in a connected state with the eNB 904. The TAU request indicates that the capabilities for the communication with the eNB 904 should be updated. In step 914, the UE receives a TAU accept message from the MME 906. After step 916, the UE 902 moves to an idle state upon receiving an RRC connection release message from the MME 906. The UE 902 may move from the connected state to the idle state immediately upon receiving the RRC connection release message.

Figure 21:
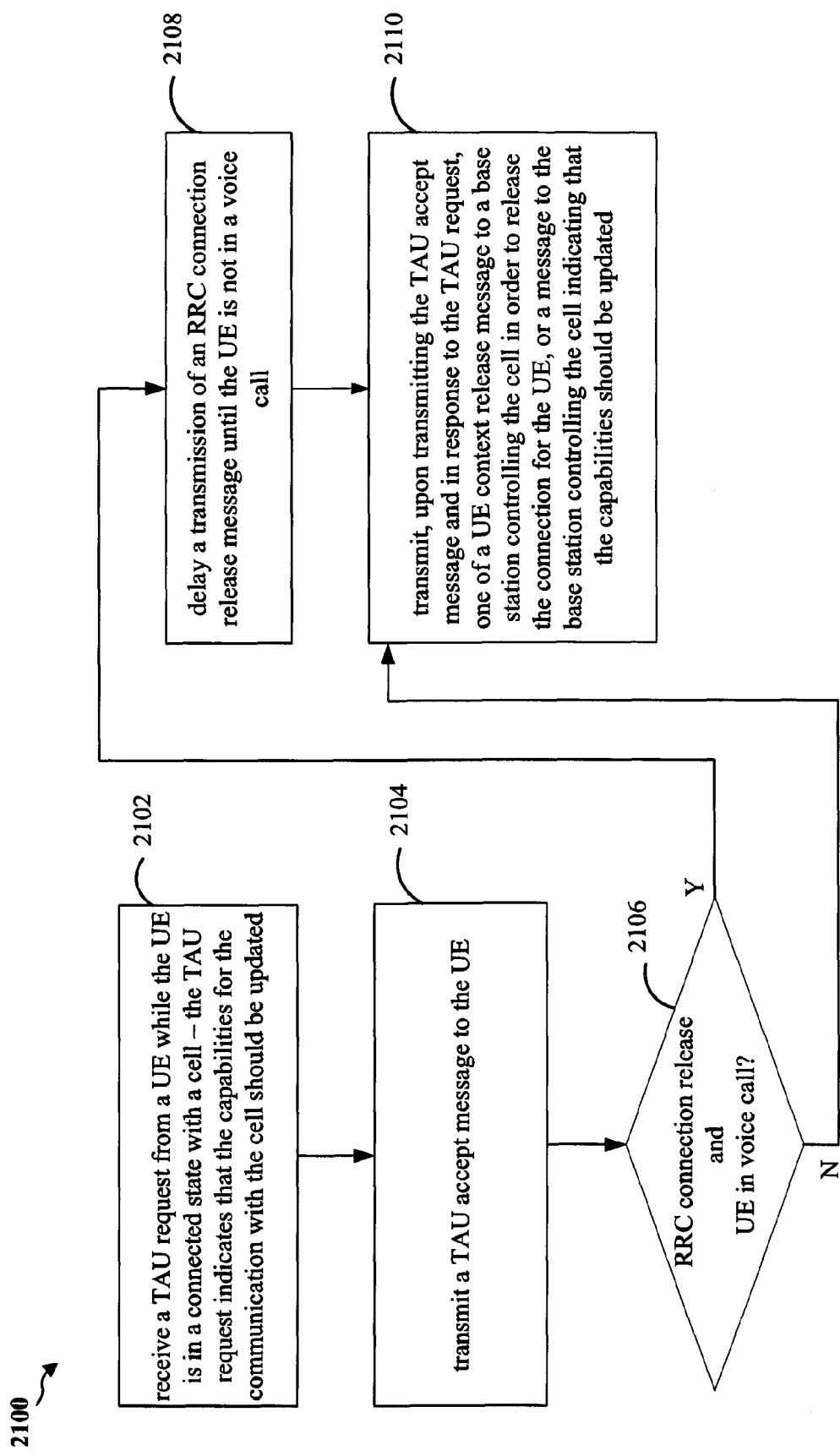
FIG. 21 is a flow chart of a sixth method of wireless communication.

FIG. 21 is a flow chart 2100 of a method of wireless communication. The method may be performed by a network entity, such as the MME 906 or the target MME 1210. In step 2102, the network entity receives a TAU request from a UE while the UE is in a connected state with a cell. The TAU request indicates that the capabilities for the communication with the cell should be updated. In step 2104, the network entity transmits a TAU accept message to the UE. In step 2106, if the network entity intends to transmit an RRC connection release message and the UE is in a voice call, step 2108 may be performed in which the network entity delays the transmission of the RRC connection release message until the UE is not in the voice call. Otherwise, the network entity transmits, upon transmitting the TAU accept message and in response to the TAU request, one of a UE context release message to a base station controlling the cell in order to release the connection for the UE, or a message to the base station controlling the cell indicating that the capabilities should be updated.

For example, referring to FIG. 9, in step 910, the MME 906 receives a TAU request (through the eNB 904) from the UE 902 while the UE 902 is in a connected state with the eNB 904. The TAU request indicates that the capabilities for the communication with the eNB 904 should be updated. In step 914, the MME 906 transmits a TAU accept message (through the eNB 904) to the UE 902. If the UE 902 is in a voice call, the MME 906 may delay the transmission of the UE context release message in step 916 until the UE 902 is not in the voice call. For another example, referring to FIG. 12, in step 1232, the target MME 1208 receives a TAU request (through the target eNB 1210) from the UE 1202 while the UE 1202 is in a connected state with the target eNB 1210. The TAU request indicates that the capabilities for the communication with the target eNB 1210 should be updated. In step 1234, the target MME 1208 transmits a TAU accept message (through the target eNB 1210) to the UE 1202. Subsequently, in step 1236, the target MME 1208 transmits a message to the target eNB 1210 indicating that the capabilities should be updated.

Figure 22:
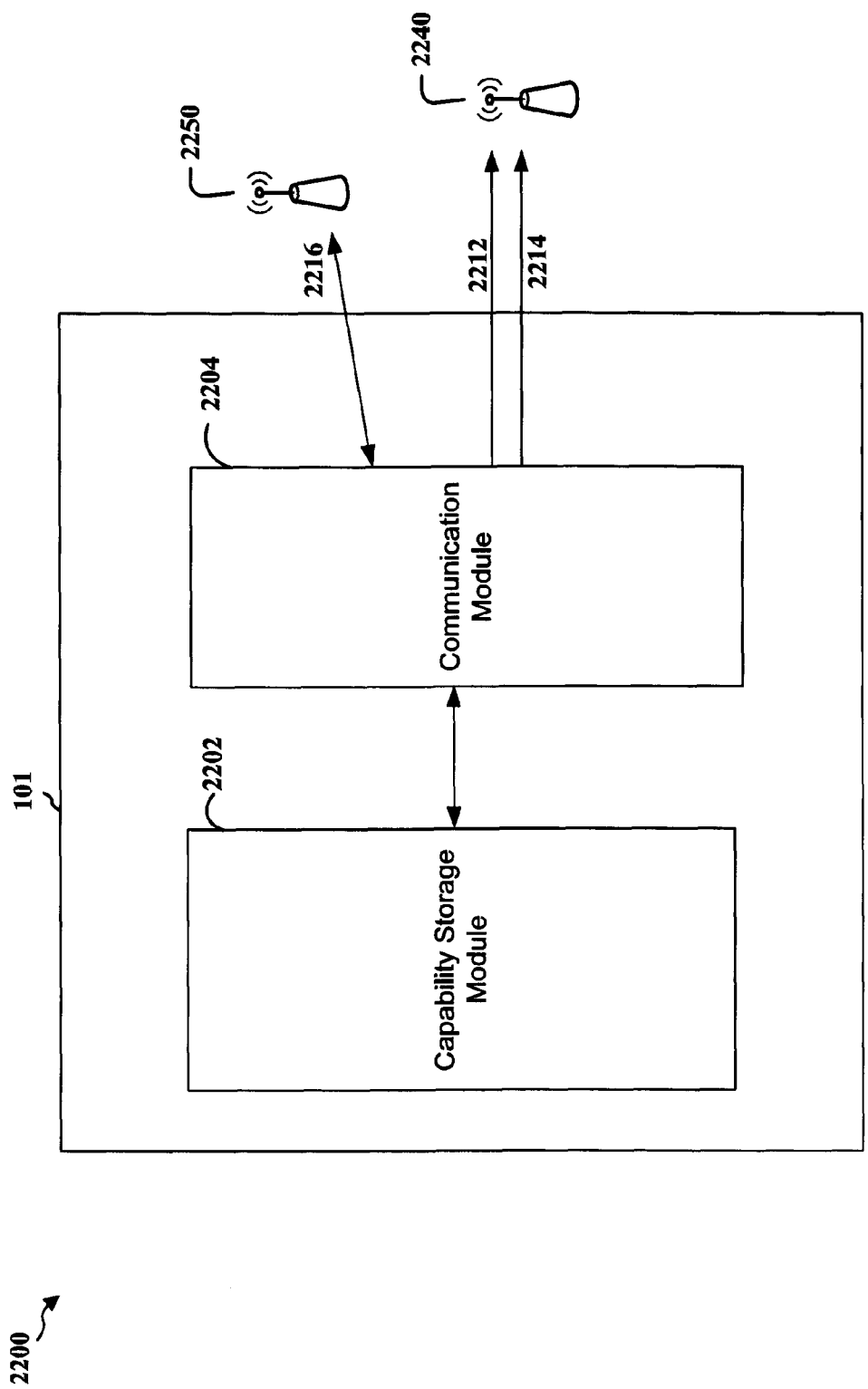
FIG. 22 is a second conceptual data flow diagram illustrating the data flow between different modules/means/components in an exemplary apparatus.

FIG. 22 is a conceptual data flow diagram 2200 illustrating the data flow between different modules/means/components in an exemplary apparatus 101. The apparatus includes a capability storage module 2202 that is configured to store a first set of capabilities for communication with the first cell 2240 and a second set of capabilities for communication with the second cell 2250. The apparatus further includes a communication module 2204 that is configured to transmit 2212 the first set of capabilities to a first cell 2240. The communication module 2204 is also configured to transmit 2214 information associated with a second set of capabilities to the first cell 2240. The communication module 2204 is configured to move communication from the first cell 2240 to the second cell 2250. The communication module 2204 is configured to communicate with the second cell 2250 based on the transmitted information.

The apparatus may include additional modules that perform each of the steps of the algorithm in the aforementioned flow chart of FIG. 17. As such, each step in the aforementioned flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 23:
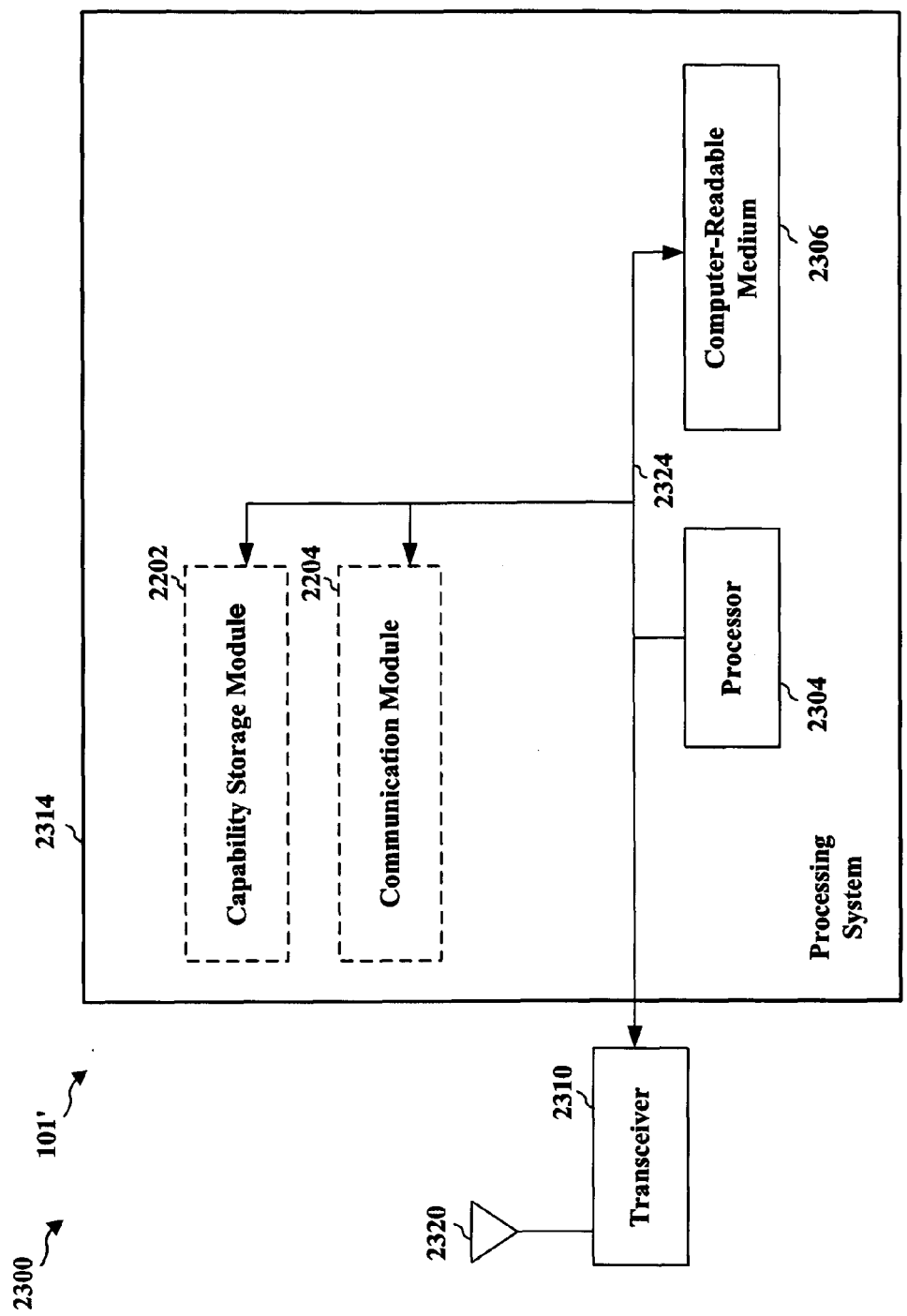
FIG. 23 is a second diagram illustrating an example of a hardware implementation for an apparatus employing a processing system.

FIG. 23 is a diagram 2300 illustrating an example of a hardware implementation for an apparatus 101' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2202, 2204 and the computer-readable medium 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes at least one of the modules 2202 and 2204. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

In one configuration, the apparatus 101/101' for wireless communication includes means for transmitting a first set of capabilities to a first cell. The first set of capabilities is for communication with the first cell. The apparatus further includes means for transmitting information associated with a second set of capabilities to the first cell. The second set of capabilities is for communication with a second cell. The apparatus further includes means for moving communication from the first cell to the second cell. The apparatus further includes means for communicating with the second cell based on the transmitted information.

The apparatus may further include means for receiving an inquiry for the first set of capabilities from the first cell. The first set of capabilities and the information associated with the second set of capabilities may be transmitted concurrently in response to the received inquiry. The apparatus may further include means for receiving an inquiry for the information from the first cell. The information may be transmitted in response to the received inquiry.

The aforementioned means may be one or more of the aforementioned modules of the apparatus 101 and/or the processing system 2314 of the apparatus 101' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 24:
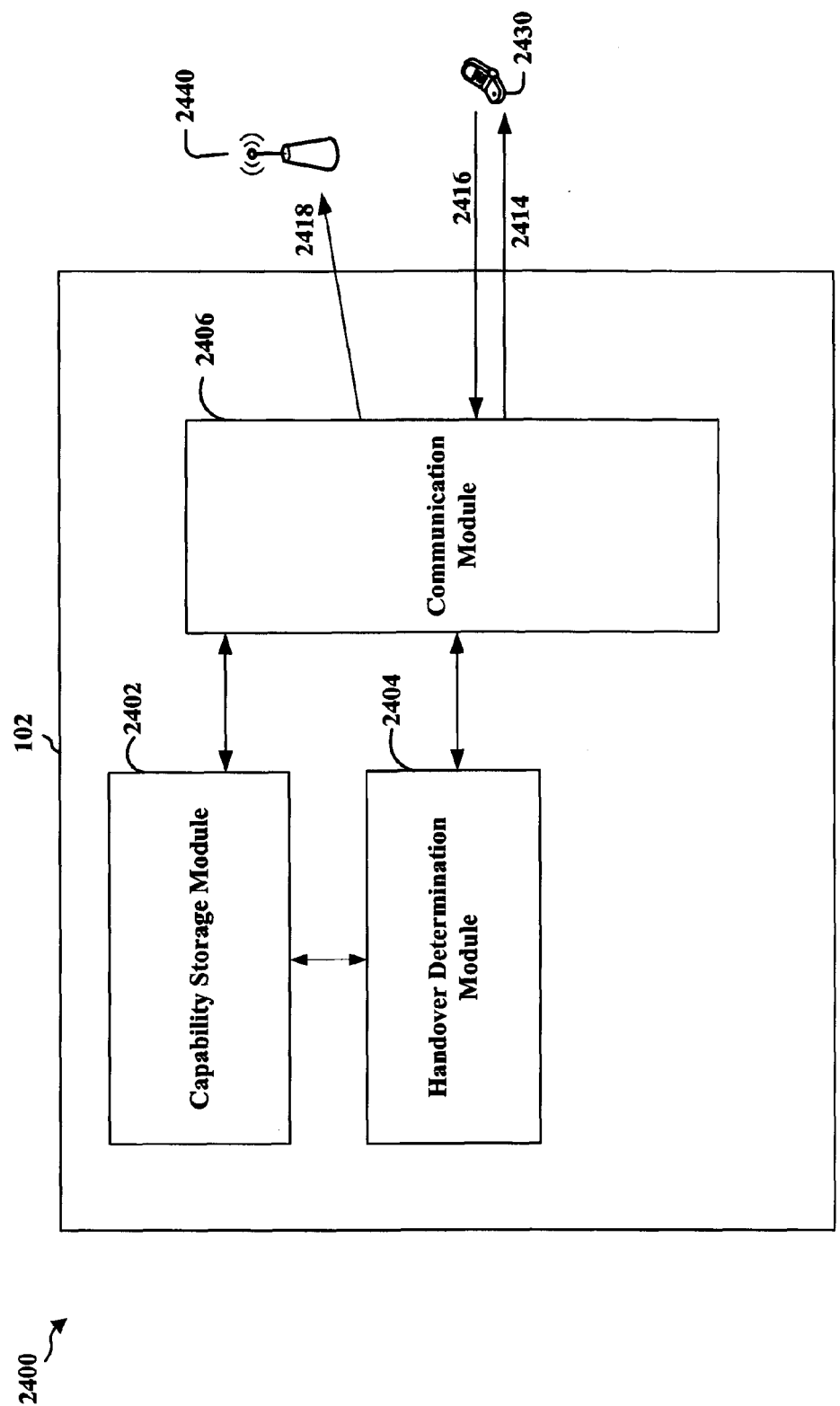
FIG. 24 is a third conceptual data flow diagram illustrating the data flow between different modules/means/components in an exemplary apparatus.

FIG. 24 is a conceptual data flow diagram 2400 illustrating the data flow between different modules/means/components in an exemplary source cell apparatus 102. The source cell includes a capability storage module 2402 that is configured to store a set of capabilities used by the UE 2430 for communicating with the target cell 2440. The source cell further includes a handover determination module 2404 that is configured to determine that the UE 2430 is subject to handover from the source cell to the target cell 2440. The source cell further includes a communication module 2406 that is configured to transmit 2414 an inquiry to the UE 2430 for a set of capabilities used by the UE 2430 for communicating with the target cell 2440. The communication module 2406 is further configured to receive 2416 the set of capabilities from the UE 2430. The communication module 2406 is further configured to provide 2418 the set of capabilities to the target cell 2440.

The apparatus may include additional modules that perform each of the steps of the algorithm in the aforementioned flow chart of FIG. 18. As such, each step in the aforementioned flow chart of FIG. 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 25:
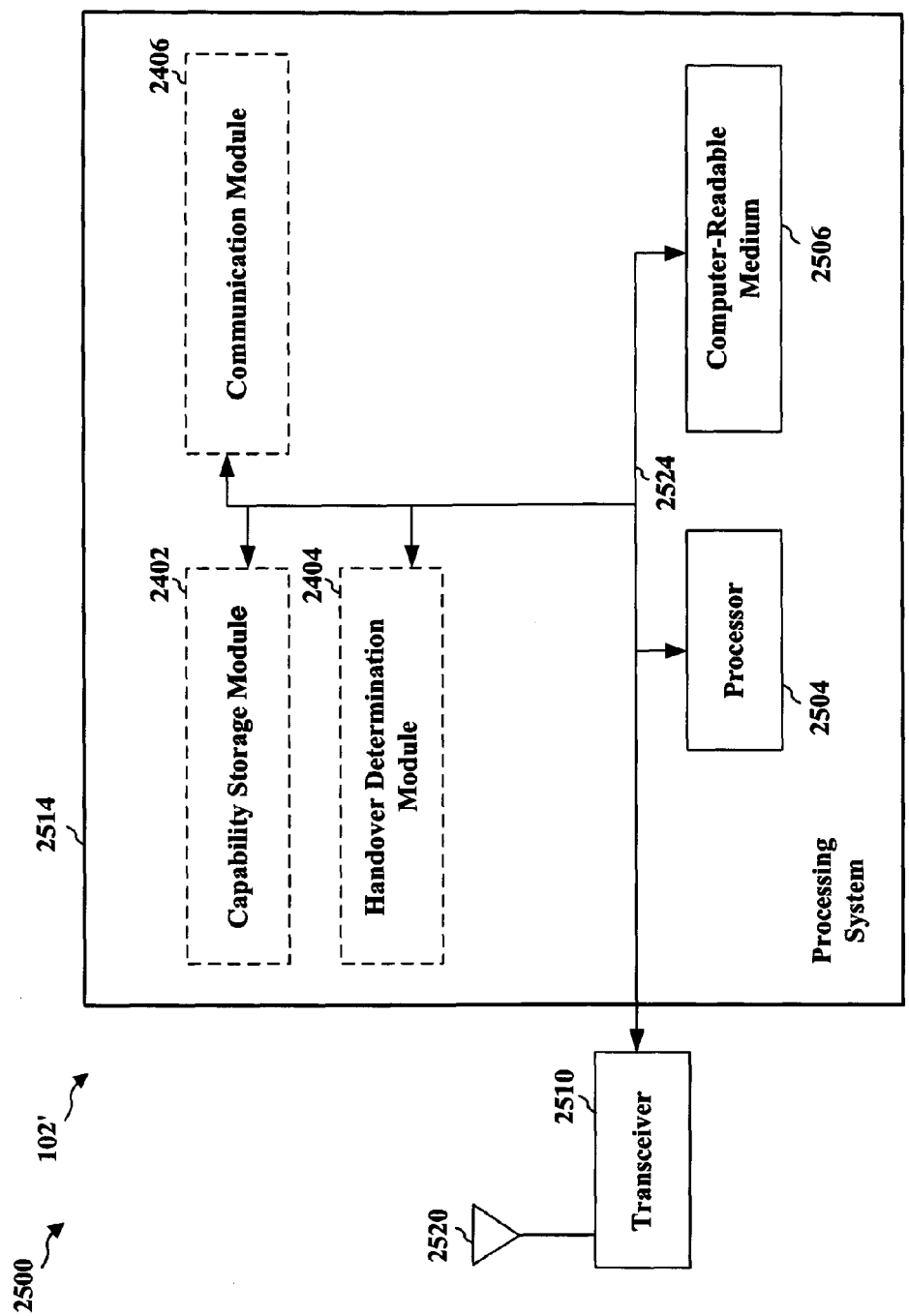
FIG. 25 is a third diagram illustrating an example of a hardware implementation for an apparatus employing a processing system.

FIG. 25 is a diagram 2500 illustrating an example of a hardware implementation for an apparatus 102' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2402, 2404, 2406 and the computer-readable medium 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The processing system 2514 includes a processor 2504 coupled to a computer-readable medium 2506. The processor 2504 is responsible for general processing, including the execution of software stored on the computer-readable medium 2506. The software, when executed by the processor 2504, causes the processing system 2514 to perform the various functions described supra for any particular apparatus. The computer-readable medium 2506 may also be used for storing data that is manipulated by the processor 2504 when executing software. The processing system further includes at least one of the modules 2402, 2404, and 2406. The modules may be software modules running in the processor 2504, resident/stored in the computer readable medium 2506, one or more hardware modules coupled to the processor 2504, or some combination thereof. The processing system 2514 may be a component of the eNB 610 and may include the memory 676 and/or at least one of the TX processor 616, the RX processor 670, and the controller/processor 675.

In one configuration, the apparatus 102/102' for wireless communication includes means for determining a UE is subject to handover from the source cell to a target cell, means for transmitting an inquiry to the UE for a set of capabilities used by the UE for communicating with the target cell, means for receiving the set of capabilities from the UE, and means for providing the set of capabilities to the target cell.

The aforementioned means may be one or more of the aforementioned modules of the apparatus 102 and/or the processing system 2514 of the apparatus 102' configured to perform the functions recited by the aforementioned means. As described supra, the processing system 2514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 26:
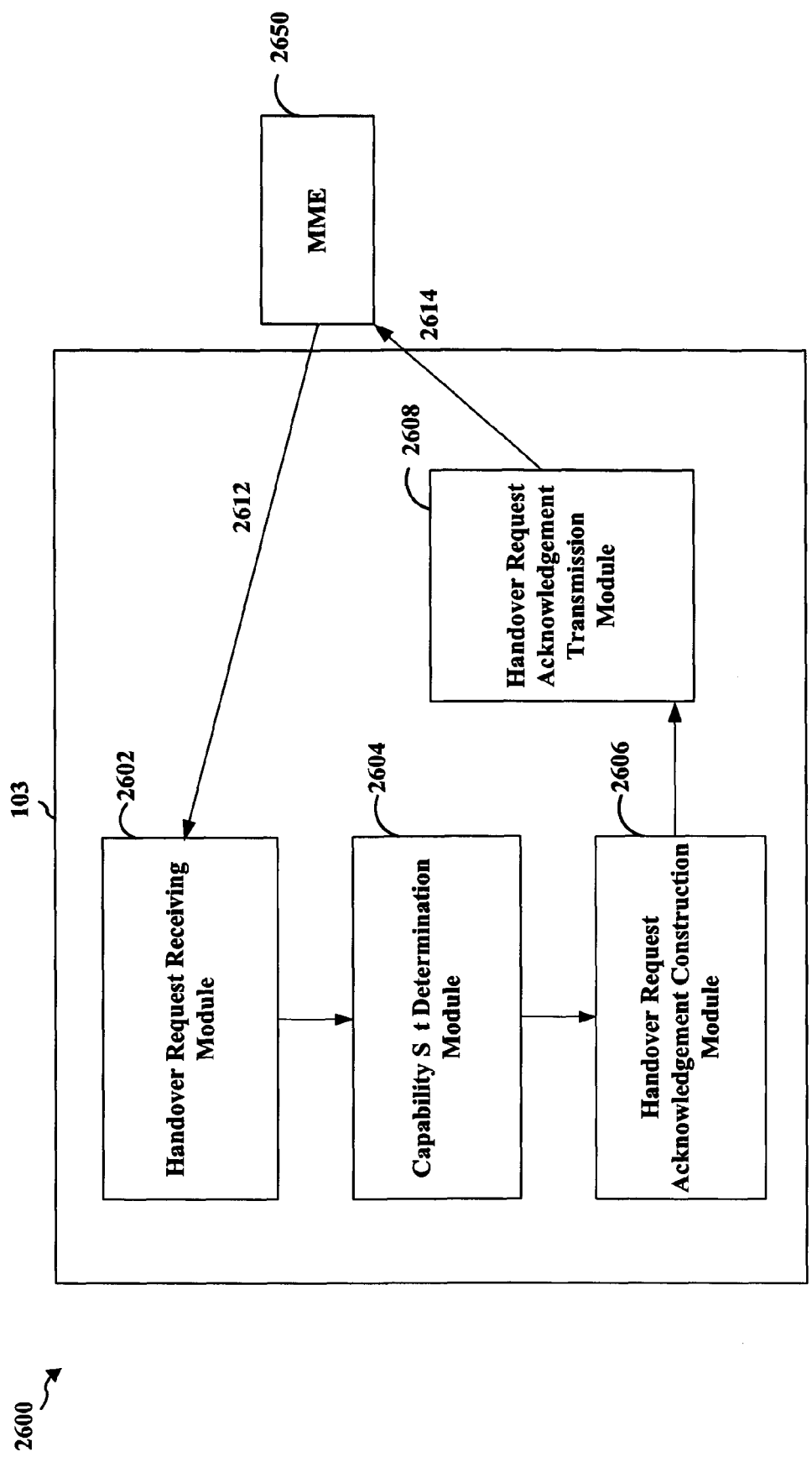
FIG. 26 is a fourth conceptual data flow diagram illustrating the data flow between different modules/means/components in an exemplary apparatus.

FIG. 26 is a conceptual data flow diagram 2600 illustrating the data flow between different modules/means/components in an exemplary target cell apparatus 103. The target cell includes a handover request receiving module 2602 that is configured to receive 2612 a handover request from a network entity 2650 for a handover of a UE from a source cell to the target cell. The handover request includes a first set of capabilities associated with the source cell. The target cell further includes a capability set determination module 2604 that is configured to determine a set of capabilities for constructing a handover request acknowledgement when the first set of capabilities is different than a second set of capabilities associated with the target cell. The set of capabilities is a subset of the second set of capabilities. The target cell further includes a handover request acknowledgement construction module 2606 that is configured to construct the handover request acknowledgement based on the set of capabilities. The target cell further includes a handover request acknowledgement transmission module 2608 that is configured to transmit 2614 the handover request acknowledgement to the network entity 2650.

The apparatus may include additional modules that perform each of the steps of the algorithm in the aforementioned flow chart of FIG. 19. As such, each step in the aforementioned flow chart of FIG. 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 27:
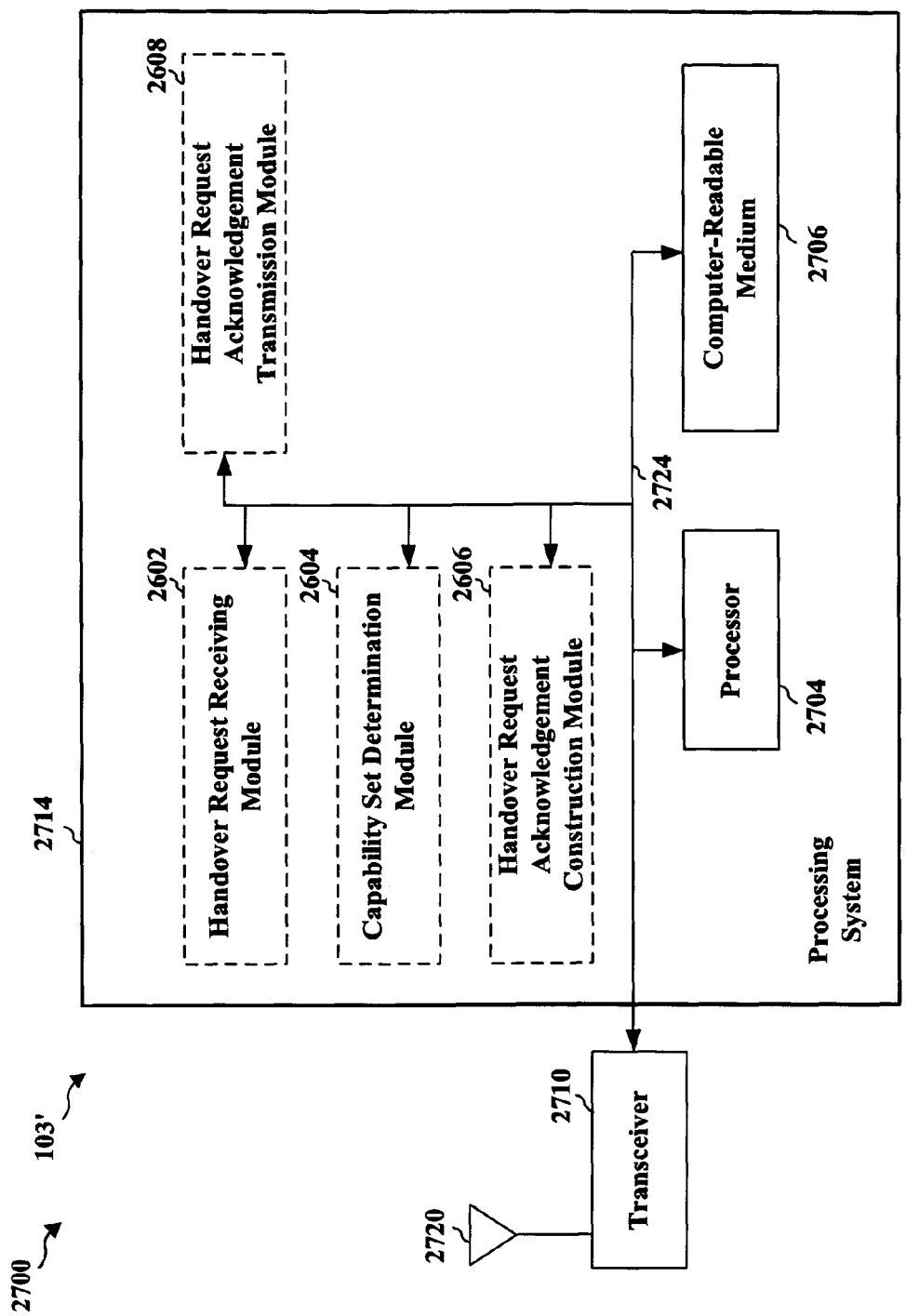
FIG. 27 is a fourth diagram illustrating an example of a hardware implementation for an apparatus employing a processing system.

FIG. 27 is a diagram 2700 illustrating an example of a hardware implementation for an apparatus 103' employing a processing system 2714. The processing system 2714 may be implemented with a bus architecture, represented generally by the bus 2724. The bus 2724 may include any number of interconnecting buses and bridges depending on the specific application of the processing system 2714 and the overall design constraints. The bus 2724 links together various circuits including one or more processors and/or hardware modules, represented by the processor 2704, the modules 2602, 2604, 2606, 2608 and the computer-readable medium 2706. The bus 2724 may also link various other circuits such as timing sources, peripherals, voltage regulators, and power management circuits, which are well known in the art, and therefore, will not be described any further.

The processing system 2714 may be coupled to a transceiver 2710. The transceiver 2710 is coupled to one or more antennas 2720. The transceiver 2710 provides a means for communicating with various other apparatus over a transmission medium. The processing system 2714 includes a processor 2704 coupled to a computer-readable medium 2706. The processor 2704 is responsible for general processing, including the execution of software stored on the computer-readable medium 2706. The software, when executed by the processor 2704, causes the processing system 2714 to perform the various functions described supra for any particular apparatus. The computer-readable medium 2706 may also be used for storing data that is manipulated by the processor 2704 when executing software. The processing system further includes at least one of the modules 2602, 2604, 2606, and 2608. The modules may be software modules running in the processor 2704, resident/stored in the computer readable medium 2706, one or more hardware modules coupled to the processor 2704, or some combination thereof. The processing system 2714 may be a component of the eNB 610 and may include the memory 676 and/or at least one of the TX processor 616, the RX processor 670, and the controller/processor 675.

In one configuration, the apparatus 103/103' for wireless communication includes means for receiving a handover request from a network entity for a handover of a UE from a source cell to the target cell. The handover request includes a first set of capabilities associated with the source cell. The apparatus further includes means for determining a set of capabilities for constructing a handover request acknowledgement when the first set of capabilities is different than a second set of capabilities associated with the target cell. The set of capabilities is a subset of the second set of capabilities. The apparatus further includes means for constructing the handover request acknowledgement based on the set of capabilities. The apparatus further includes means for transmitting the handover request acknowledgement to the network entity.

The apparatus may further include means for transmitting a capability inquiry to the UE for the second set of capabilities upon a handover of the UE to the target cell, and means for receiving the second set of capabilities from the UE. In one configuration, the handover request includes an indication of whether at least one subset of a second set of capabilities associated with the target cell is the same as at least one subset of the first set of capabilities, and the set of capabilities is determined based on the indication. In such a configuration, the apparatus may further include means for transmitting a capability inquiry to the UE for the second set of capabilities when the indication indicates that the at least one subset of the second set of capabilities is different than the at least one subset of the first set of capabilities, or the at least one subset of the second set of capabilities is the same as the at least one subset of the first set of capabilities and the at least one subset of the second set of capabilities does not include all of the second set of capabilities; and means for receiving the second set of capabilities from the UE.

The aforementioned means may be one or more of the aforementioned modules of the apparatus 103 and/or the processing system 2714 of the apparatus 103' configured to perform the functions recited by the aforementioned means. As described supra, the processing system 2714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 28:
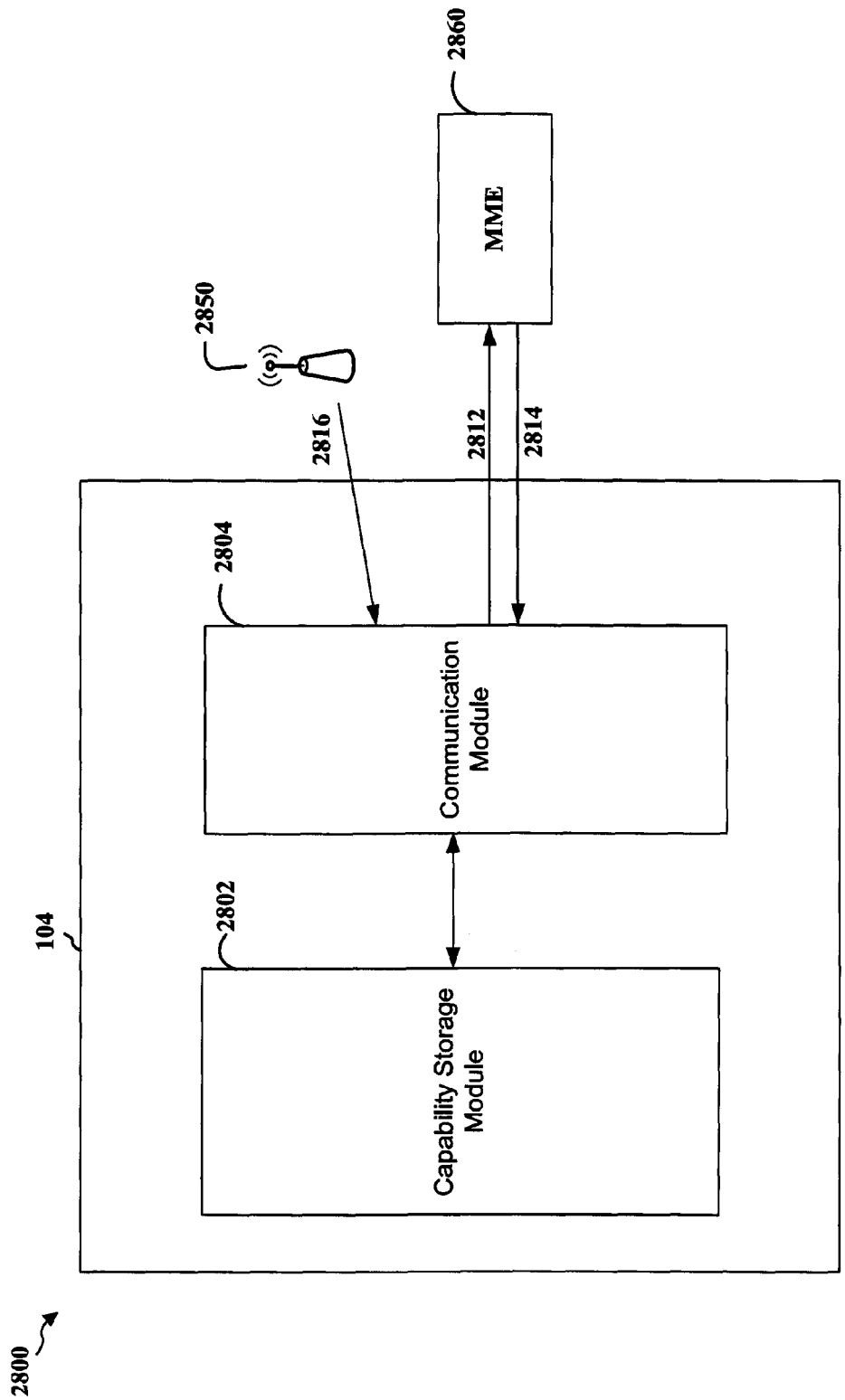
FIG. 28 is a fifth conceptual data flow diagram illustrating the data flow between different modules/means/components in an exemplary apparatus.

FIG. 28 is a conceptual data flow diagram 2800 illustrating the data flow between different modules/means/components in an exemplary UE apparatus 104. The UE includes a capability storage module 2802 that is configured to store capabilities for communication with a cell. The UE further includes a communication module 2804 that is configured to transmit 2812 a TAU request to a network entity 2860 while in a connected state with a cell (i.e., sector of the base station 2850). The TAU request indicates that the capabilities for the communication with the cell should be updated. The communication module 2804 is further configured to receive 2814 a TAU accept message from the network entity 2860. The communication module 2804 is further configured to move to an idle state upon receiving 2816 an RRC connection release message from a base station 2850 associated with the network entity 2860. While the TAU request and the TAU accept message are shown as being transmitted directly to the network entity 2860, the TAU request and TAU accept message are communicated through the base station 2850.

The apparatus may include additional modules that perform each of the steps of the algorithm in the aforementioned flow chart of FIG. 20. As such, each step in the aforementioned flow chart of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 29:
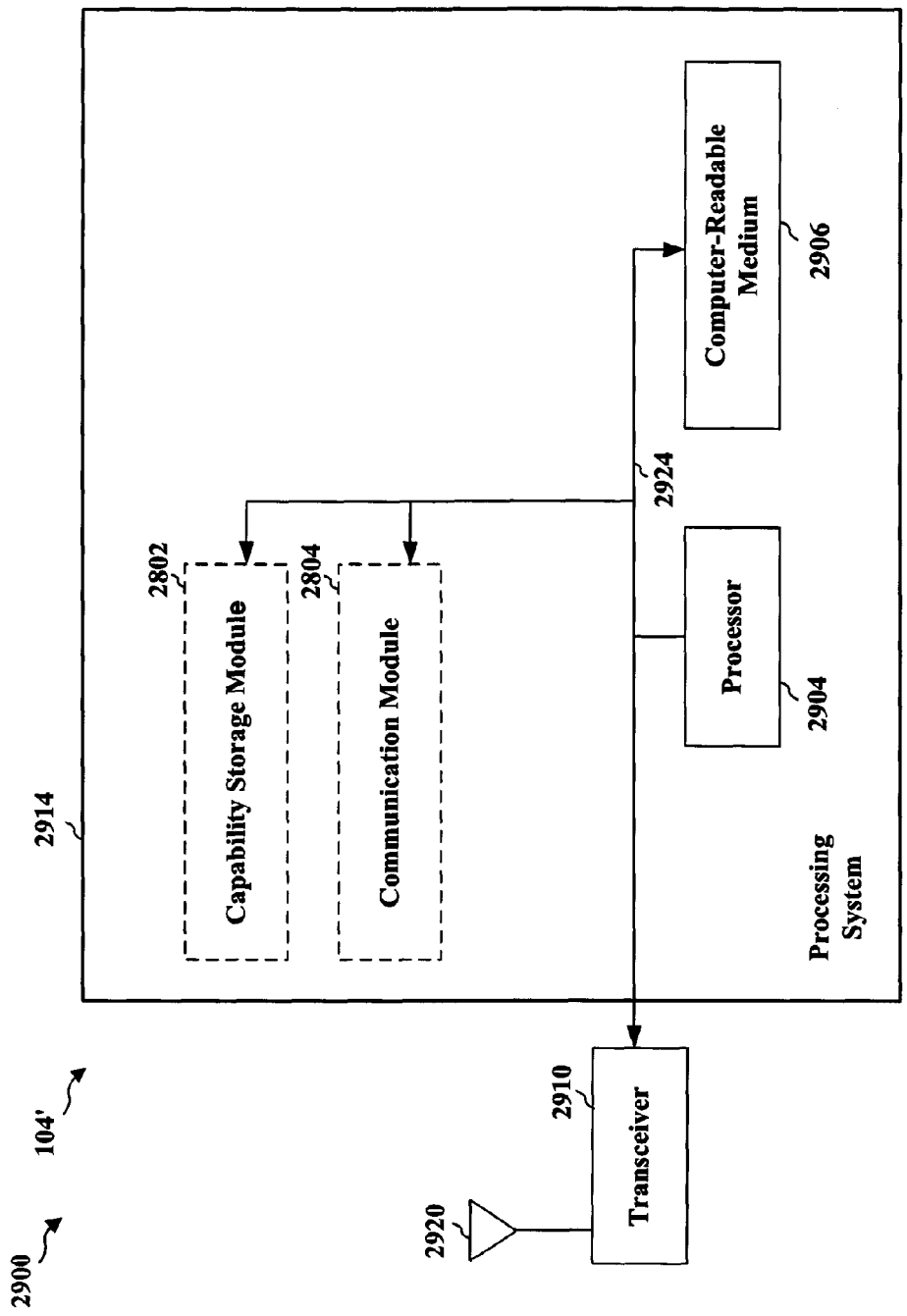
FIG. 29 is a fifth diagram illustrating an example of a hardware implementation for an apparatus employing a processing system.

FIG. 29 is a diagram 2900 illustrating an example of a hardware implementation for an apparatus 104' employing a processing system 2914. The processing system 2914 may be implemented with a bus architecture, represented generally by the bus 2924. The bus 2924 may include any number of interconnecting buses and bridges depending on the specific application of the processing system 2914 and the overall design constraints. The bus 2924 links together various circuits including one or more processors and/or hardware modules, represented by the processor 2904, the modules 2802, 2804 and the computer-readable medium 2906. The bus 2924 may also link various other circuits such as timing sources, peripherals, voltage regulators, and power management circuits, which are well known in the art, and therefore, will not be described any further.

The processing system 2914 may be coupled to a transceiver 2910. The transceiver 2910 is coupled to one or more antennas 2920. The transceiver 2910 provides a means for communicating with various other apparatus over a transmission medium. The processing system 2914 includes a processor 2904 coupled to a computer-readable medium 2906. The processor 2904 is responsible for general processing, including the execution of software stored on the computer-readable medium 2906. The software, when executed by the processor 2904, causes the processing system 2914 to perform the various functions described supra for any particular apparatus. The computer-readable medium 2906 may also be used for storing data that is manipulated by the processor 2904 when executing software. The processing system further includes at least one of the modules 2802 and 2804. The modules may be software modules running in the processor 2904, resident/stored in the computer readable medium 2906, one or more hardware modules coupled to the processor 2904, or some combination thereof. The processing system 2914 may be a component of the UE 650 and may include the memory 660 and/or at least one of the TX processor 668, the RX processor 656, and the controller/processor 659.

In one configuration, the apparatus 104/104' for wireless communication includes means for transmitting a TAU request to a network entity while in a connected state with a cell. The TAU request indicates that the capabilities for the communication with the cell should be updated. The apparatus further includes means for receiving a TAU accept message from the network entity. The apparatus further includes means for moving to an idle state upon receiving an RRC connection release message from a base station associated with the network entity.

The aforementioned means may be one or more of the aforementioned modules of the apparatus 104 and/or the processing system 2914 of the apparatus 104' configured to perform the functions recited by the aforementioned means. As described supra, the processing system 2914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 30:
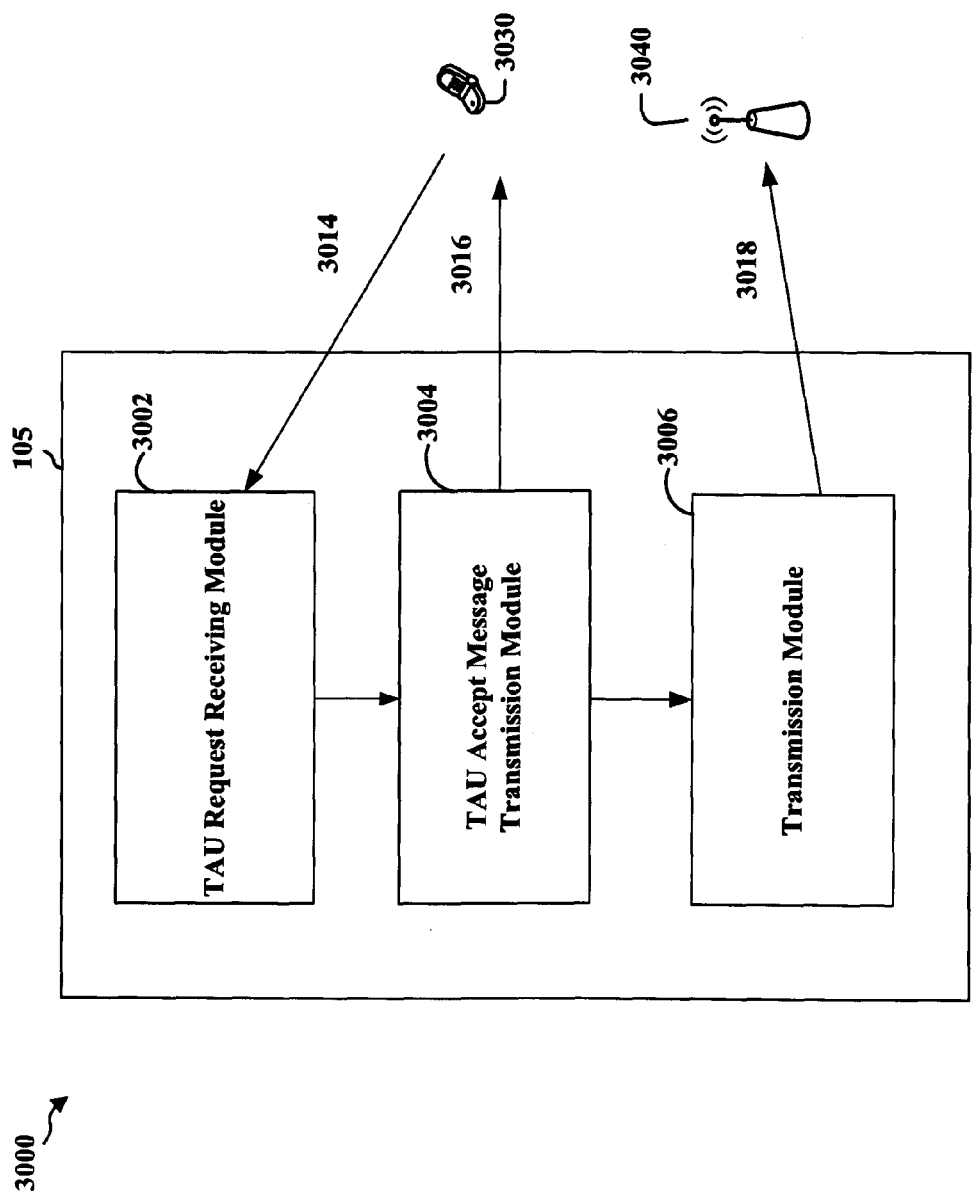
FIG. 30 is a sixth conceptual data flow diagram illustrating the data flow between different modules/means/components in an exemplary apparatus.

FIG. 30 is a conceptual data flow diagram 3000 illustrating the data flow between different modules/means/components in an exemplary network entity (e.g., MME) apparatus 105. The network entity includes a TAU request receiving module 3002 that is configured to receive 3014 a TAU request from a UE 3030 while the UE 3030 is in a connected state with a cell. The TAU request indicates that the capabilities for the communication with the cell should be updated. The network entity further includes a TAU accept message transmission module 3004 that is configured to transmit 3016 a TAU accept message to the UE 3030. The network entity further includes a transmission module 3006 that is configured to transmit 3018, upon transmitting the TAU accept message and in response to the TAU request, one of a UE context release message to a base station 3040 controlling the cell in order to release the connection for the UE 3030, or a message to the base station 3040 controlling the cell indicating that the capabilities should be updated. The transmission module 3006 may be configured to delay the transmission of the RRC connection release message until the UE 3030 is not in a voice call.

The apparatus may include additional modules that perform each of the steps of the algorithm in the aforementioned flow chart of FIG. 21. As such, each step in the aforementioned flow chart of FIG. 21 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 31:
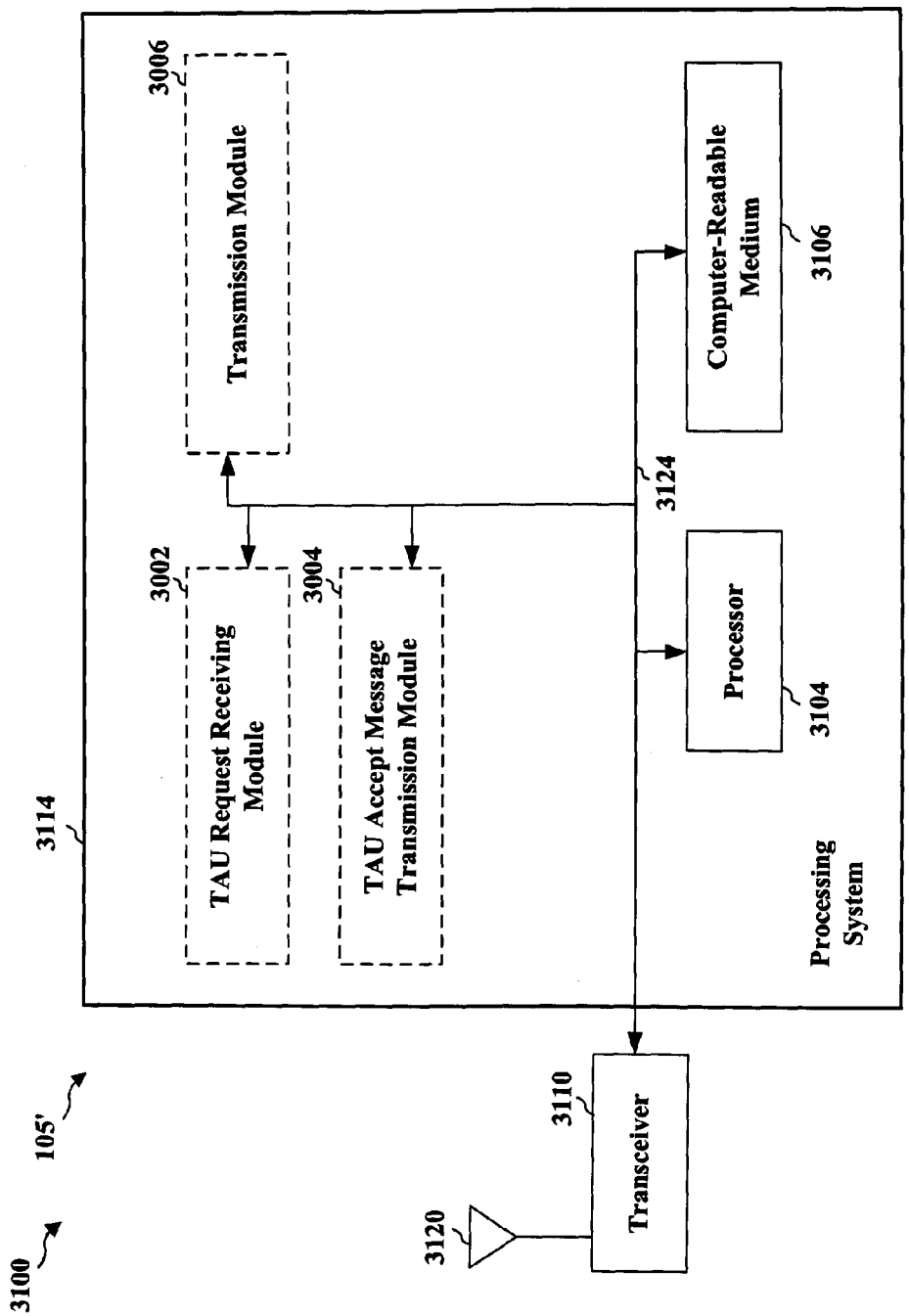
FIG. 31 is a sixth diagram illustrating an example of a hardware implementation for an apparatus employing a processing system.

FIG. 31 is a diagram 3100 illustrating an example of a hardware implementation for an apparatus 105' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware modules, represented by the processor 3104, the modules 3002, 3004, 3006 and the computer-readable medium 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The processing system 3114 includes a processor 3104 coupled to a computer-readable medium 3106. The processor 3104 is responsible for general processing, including the execution of software stored on the computer-readable medium 3106. The software, when executed by the processor 3104, causes the processing system 3114 to perform the various functions described supra for any particular apparatus. The computer-readable medium 3106 may also be used for storing data that is manipulated by the processor 3104 when executing software. The processing system further includes at least one of the modules 3002, 3004, and 3006. The modules may be software modules running in the processor 3104, resident/stored in the computer readable medium 3106, one or more hardware modules coupled to the processor 3104, or some combination thereof.

In one configuration, the apparatus 105/105' for wireless communication includes means for receiving a TAU request from a UE while the UE is in a connected state with a cell. The TAU request indicates that the capabilities for the communication with the cell should be updated. The apparatus further includes means for transmitting a TAU accept message to the UE. The apparatus further includes means for transmitting, upon transmitting the TAU accept message and in response to the TAU request, one of a UE context release message to a base station controlling the cell in order to release the connection for the UE, or a message to the base station controlling the cell indicating that the capabilities should be updated. The apparatus may further include means for delaying the transmission of the RRC connection release message until the UE is not in a voice call. The aforementioned means may be one or more of the aforementioned modules of the apparatus 105 and/or the processing system 3114 of the apparatus 105' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A method of wireless communication performed by a user equipment (UE), comprising:
   transmitting a first set of capabilities from the UE to a first cell, the first set of capabilities being for communication with the first cell;

transmitting information associated with a second set of capabilities from the UE to the first cell, the second set of capabilities being for communication with a second cell, where the first set of capabilities and the second set of capabilities are different;

moving from the first cell to the second cell;

transmitting a tracking area update (TAU) request to a network entity associated with the second cell, the TAU request indicating that the capabilities for communication with the second cell should be updated;

receiving a TAU accept message from the network entity; and moving to an idle state upon receiving a radio resource control (RRC) connection release message from the second cell.

2. The method of claim 1, further comprising receiving an inquiry for the first set of capabilities from the first cell, wherein the first set of capabilities and the information associated with the second set of capabilities are transmitted concurrently in response to the received inquiry.

3. The method of claim 1, further comprising receiving an inquiry for the information from the first cell, wherein the information is transmitted in response to the received inquiry.

4. The method of claim 1, wherein the information comprises at least one bit indicating whether, for the UE, at least one subset of the second set of capabilities for communication with the second cell is the same as at least one subset of the first set of capabilities for communication with the first cell.

5. The method of claim 4, wherein the at least one bit is transmitted in a capability within the transmitted first set of capabilities.

6. The method of claim 1, wherein the information comprises the second set of capabilities.

7. The method of claim 1, wherein the first set of capabilities includes capabilities associated with frequency division duplexing (FDD) communication and the second set of capabilities includes capabilities associated with time division duplexing (TDD) communication.

8. The method of claim 1, wherein the first set of capabilities includes capabilities associated with time division duplexing (TDD) communication and the second set of capabilities includes capabilities associated with frequency division duplexing (FDD) communication.

9. The method of claim 1, wherein the first cell and the second cell belong to a same evolved Node B (eNB).

10. The method of claim 1, wherein the first cell belongs to a first evolved Node B (eNB) and the second cell belongs to a second eNB different than the first eNB.

11. The method of claim 10, wherein the first eNB and the second eNB belong to a same network.

12. The method of claim 10, wherein the first eNB and the second eNB belong to different networks.

13. The method of claim 1, wherein the UE moves from the connected state to the idle state immediately upon receiving the RRC connection release message.

14. The method of claim 1, wherein, when the UE is performing a voice call, the UE delays moving from the connected state to the idle state until the voice call is finished.

15. The method of claim 1, further comprising:
sending an RRC connection request to the base station upon entering the idle mode.

16. The method of claim 15, further comprising:
sending an initial context setup message to the network entity;

receiving a capability inquiry from the base station; and
sending an updated set of capabilities to the base station.

17. The method of claim 1, further comprising:
determining whether the first set of capabilities and the second set of capabilities are different and whether the first cell or the second cell queried for the second set of capabilities after moving to the second cell; and re-attaching to a network associated with the second cell in order to cause the second cell to query for the second set of capabilities upon determining that the first set of capabilities and the second set of capabilities are different, and that the first cell and the second cell did not query for the second set of capabilities.

18. An apparatus for wireless communication performed by a user equipment (UE), comprising:
means for transmitting a first set of capabilities from the UE to a first cell, the first set of capabilities being for communication with the first cell;

means for transmitting information associated with a second set of capabilities from the UE to the first cell, the second set of capabilities being for communication with a second cell, where the first set of capabilities and the second set of capabilities are different;

means for moving from the first cell to the second cell;

means for transmitting a tracking area update (TAU) request to a network entity associated with the second cell, the TAU request indicating that the capabilities for communication with the second cell should be updated;

means for receiving a TAU accept message from the network entity; and means for moving to an idle state upon receiving a radio resource control (RRC) connection release message from the second cell.

19. The apparatus of claim 18, further comprising means for receiving an inquiry for the first set of capabilities from the first cell, wherein the first set of capabilities and the information associated with the second set of capabilities are transmitted concurrently in response to the received inquiry.

20. The apparatus of claim 18, further comprising means for receiving an inquiry for the information from the first cell, wherein the information is transmitted in response to the received inquiry.

21. The apparatus of claim 18, wherein the information comprises at least one bit indicating whether at least one subset of the second set of capabilities for communication of the UE with the second cell is the same as at least one subset of the first set of capabilities for communication of the UE with the first cell.

22. The apparatus of claim 21, wherein the at least one bit is transmitted in a capability within the transmitted first set of capabilities.

23. The apparatus of claim 18, wherein the information comprises the second set of capabilities.

24. The apparatus of claim 18, wherein the first set of capabilities includes capabilities associated with frequency division duplexing (FDD) communication and the second set of capabilities includes capabilities associated with time division duplexing (TDD) communication.

25. The apparatus of claim 18, wherein the first set of capabilities includes capabilities associated with time division duplexing (TDD) communication and the second set of capabilities includes capabilities associated with frequency division duplexing (FDD) communication.

26. The apparatus of claim 18, wherein the first cell and the second cell belong to a same evolved Node B (eNB).

27. The apparatus of claim 18, wherein the first cell belongs to a first evolved Node B (eNB) and the second cell belongs to a second eNB different than the first eNB.

28. The apparatus of claim 27, wherein the first eNB and the second eNB belong to a same network.

29. The apparatus of claim 27, wherein the first eNB and the second eNB belong to different networks.

30. An apparatus for wireless communication performed by a user equipment (UE), comprising:
  a memory; and
  at least one processor coupled to the memory and configured to:
    transmit a first set of capabilities from the UE to a first cell, the first set of capabilities being for communication with the first cell;
    transmit information associated with a second set of capabilities from the UE to the first cell, the second set of capabilities being for communication with a second cell, where the first set of capabilities and the second set of capabilities are different;
    move from the first cell to the second cell;
    transmit a tracking area update (TAU) request to a network entity associated with the second cell, the TAU request indicating that the capabilities for communication with the second cell should be updated;
    receive a TAU accept message from the network entity; and
    move to an idle state upon receiving a radio resource control (RRC) connection release message from the second cell.

31. The apparatus of claim 30, wherein the processing system is further configured to receive an inquiry for the first set of capabilities from the first cell, wherein the first set of capabilities and the information associated with the second set of capabilities are transmitted concurrently in response to the received inquiry.

32. The apparatus of claim 30, wherein the processing system is further configured to receive an inquiry for the information from the first cell, wherein the information is transmitted in response to the received inquiry.

33. The apparatus of claim 30, wherein the information comprises at least one bit indicating whether at least one subset of the second set of capabilities for communication of the UE with the second cell is the same as at least one subset of the first set of capabilities for communication of the UE with the first cell.

34. The apparatus of claim 33, wherein the at least one bit is transmitted in a capability within the transmitted first set of capabilities.

35. The apparatus of claim 30, wherein the information comprises the second set of capabilities.

36. The apparatus of claim 30, wherein the first set of capabilities includes capabilities associated with frequency division duplexing (FDD) communication and the second set of capabilities includes capabilities associated with time division duplexing (TDD) communication.

37. The apparatus of claim 30, wherein the first set of capabilities includes capabilities associated with time division duplexing (TDD) communication and the second set of capabilities includes capabilities associated with frequency division duplexing (FDD) communication.

38. The apparatus of claim 30, wherein the first cell and the second cell belong to a same evolved Node B (eNB).

39. The apparatus of claim 30, wherein the first cell belongs to a first evolved Node B (eNB) and the second cell belongs to a second eNB different than the first eNB.

40. The apparatus of claim 39, wherein the first eNB and the second eNB belong to a same network.

41. The apparatus of claim 39, wherein the first eNB and the second eNB belong to different networks.

42. A non-transitory computer-readable medium storing computer executable code for wireless communication at a user equipment (UE), the computer executable code causing a processor to:
  transmit a first set of capabilities from the UE to a first cell, the first set of capabilities being for communication with the first cell;
  transmit information associated with a second set of capabilities from the UE to the first cell, the second set of capabilities being for communication with a second cell, where the first set of capabilities and the second set of capabilities are different;
  move from the first cell to the second cell;
  transmit a tracking area update (TAU) request to a network entity associated with the second cell, the TAU request indicating that the capabilities for communication with the second cell should be updated;
  receive a TAU accept message from the network entity; and
  move to an idle state upon receiving a radio resource control (RRC) connection release message from the second cell.

* * * * *